US010865709B2

(12) United States Patent
Hwang

(10) Patent No.: US 10,865,709 B2
(45) Date of Patent: Dec. 15, 2020

(54) FLEX-FUEL HYDROGEN REFORMER FOR IC ENGINES AND GAS TURBINES

(71) Applicant: Herng Shinn Hwang, Livingston, NJ (US)

(72) Inventor: Herng Shinn Hwang, Livingston, NJ (US)

( * ) Notice: Subject to any disclaimer, the term of this patent is extended or adjusted under 35 U.S.C. 154(b) by 636 days.

(21) Appl. No.: 15/096,219

(22) Filed: Apr. 11, 2016

(65) Prior Publication Data

US 2017/0292446 A1 Oct. 12, 2017
US 2020/0116082 A9 Apr. 16, 2020

Related U.S. Application Data

(62) Division of application No. 13/900,479, filed on May 22, 2013, now Pat. No. 9,440,851.

(60) Provisional application No. 61/688,853, filed on May 23, 2012.

(51) Int. Cl.
*F02C 3/20* (2006.01)
*B01J 8/00* (2006.01)
*B01J 8/02* (2006.01)

(52) U.S. Cl.
CPC .......... *F02C 3/20* (2013.01); *B01J 8/001* (2013.01); *B01J 8/0278* (2013.01); *B01J 2208/00548* (2013.01); *B01J 2208/02* (2013.01)

(58) Field of Classification Search
CPC .. F02C 3/20; B01J 8/001; B01J 8/0278; B01J 2208/00548; B01J 2208/02
See application file for complete search history.

(56) References Cited

U.S. PATENT DOCUMENTS

| 2,882,912 A | 4/1959 | Reeg |
| 2,925,375 A | 2/1960 | Fleck |
| 2,944,396 A | 7/1960 | Barton |
| 3,388,074 A | 6/1968 | Reitmeier |

(Continued)

FOREIGN PATENT DOCUMENTS

| TW | I617508 B | 6/2018 |
| WO | 2001034950 | 5/2001 |
| WO | WO01/34950 | 5/2001 |

OTHER PUBLICATIONS

Hwang, H.S. et al., AiChe Annual Meeting, Los Angels CA. Nov. 15, 2000.

(Continued)

*Primary Examiner* — Carlos A Rivera
(74) *Attorney, Agent, or Firm* — Niels Haun; Dann, Dorfman, Herrell & Skillman, P.C.

(57) ABSTRACT

An on-board Flex-Fuel $H_2$ reforming apparatus provides devices and the methods of operating these devices to produce a combustible reformate containing $H_2$ and CO from hydrocarbons and bio-fuels. For this generator, one or more parallel autothermal reformers are used to convert the fuels into the reformate over Pt group metal catalysts, and the produced reformate is then cooled, compressed and stored in vessels at a pressure between 1 to 100 atmospheres. The reformate from the storage vessels is used either as the sole fuel or is mixed with other fuels as the fuel mixture for a lean burn engine/gas turbine. For this system, the pressure of the storage vessels and the flow control curves are used directly to control the amount of the reformers' reformate flow output.

23 Claims, 9 Drawing Sheets

(56) References Cited

U.S. PATENT DOCUMENTS

| | | |
|---|---|---|
| 3,446,594 A | 5/1969 | Buswell |
| 3,654,182 A | 4/1972 | Hayes |
| 3,655,448 A | 4/1972 | Setzer |
| 3,915,125 A | 10/1975 | Henkel et al. |
| 3,955,941 A | 5/1976 | Houseman et al. |
| 3,971,847 A | 7/1976 | Houseman |
| 3,975,900 A | 8/1976 | Pfefferle |
| 3,976,507 A * | 8/1976 | Bloomfield ......... H01M 8/0612 429/415 |
| 3,982,910 A | 9/1976 | Houseman et al. |
| 4,024,912 A | 5/1977 | Hamrick |
| 4,033,133 A | 7/1977 | Houseman |
| 4,109,461 A | 8/1978 | Fujitani et al. |
| 4,120,787 A | 10/1978 | Yargeau |
| 4,128,700 A | 12/1978 | Sederquist |
| 4,200,682 A | 4/1980 | Sederquist |
| 4,203,963 A | 5/1980 | Scheffler |
| 4,522,894 A | 6/1985 | Hwang et al. |
| 4,552,733 A | 11/1985 | Thompson |
| 4,567,857 A | 2/1986 | Houseman et al. |
| 4,622,210 A | 11/1986 | Hirschberg |
| 4,780,447 A | 10/1988 | Kim |
| 4,844,837 A | 7/1989 | Heck |
| 4,939,113 A | 7/1990 | Tauster |
| 5,024,985 A | 6/1991 | Koberstein |
| 5,196,390 A | 3/1993 | Tauster |
| 5,235,804 A | 8/1993 | Colket, III |
| 5,326,253 A | 7/1994 | Dalla Betta |
| 5,425,332 A | 6/1995 | Rabinovich et al. |
| 5,441,401 A | 8/1995 | Yamaguro et al. |
| 5,586,433 A | 12/1996 | Boegner et al. |
| 5,648,582 A | 7/1997 | Schmidt et al. |
| 5,794,601 A | 8/1998 | Pantone |
| 5,896,738 A | 4/1999 | Yang |
| 5,947,063 A | 9/1999 | Smith et al. |
| 5,987,878 A | 11/1999 | Koyama |
| 6,110,861 A | 8/2000 | Krumpelt et al. |
| 6,254,807 B1 | 7/2001 | Schmidt |
| 6,358,040 B1 | 3/2002 | Pfefferle |
| 6,415,775 B1 | 7/2002 | Lahti |
| 6,436,363 B1 | 8/2002 | Hwang et al. |
| 6,655,130 B1 | 12/2003 | Kirwan |
| 6,682,838 B2 | 1/2004 | Stevens |
| 6,713,040 B2 | 3/2004 | Ahmed et al. |
| 6,849,572 B2 | 2/2005 | Hwang et al. |
| 6,849,752 B2 | 2/2005 | Tsujioka |
| 6,895,746 B2 | 5/2005 | Buglass |
| 6,845,610 B2 | 6/2005 | Shiino et al. |
| 6,936,082 B2 * | 8/2005 | Primdahl ................. B01J 8/025 422/628 |
| 6,946,209 B1 | 9/2005 | Israelson |
| 6,960,840 B2 | 11/2005 | Willis |
| 6,964,156 B2 | 11/2005 | Liu |
| 6,977,067 B2 | 12/2005 | Hwang |
| 7,028,644 B2 | 4/2006 | Cohn et al. |
| 7,074,375 B2 | 7/2006 | Lampert |
| 7,082,753 B2 | 8/2006 | Dalla Betta |
| 7,101,531 B2 | 9/2006 | Kamijo |
| 7,128,768 B2 | 10/2006 | Liu |
| 7,225,787 B2 | 6/2007 | Bromberg et al. |
| 7,255,848 B2 | 8/2007 | Deluga |
| 7,262,334 B2 | 8/2007 | Schmidt |
| 7,610,752 B2 | 11/2009 | Dalla Betta et al. |
| 7,721,682 B2 | 5/2010 | Fulton et al. |
| 7,810,315 B2 | 10/2010 | Yan |
| 7,820,037 B2 | 10/2010 | Masuda |
| 7,871,459 B2 | 1/2011 | Stephanopoulos |
| 7,900,441 B2 | 3/2011 | Mital |
| 7,901,566 B2 | 3/2011 | Giroux |
| 8,061,120 B2 | 11/2011 | Hwang et al. |
| 8,091,536 B2 | 1/2012 | Munshi et al. |
| 8,236,262 B2 | 8/2012 | Potter |
| 8,308,848 B1 | 11/2012 | Alptekin |
| 8,396,644 B2 | 3/2013 | Kabashima et al. |
| 8,397,509 B2 | 3/2013 | Hwang |
| 8,430,938 B1 | 4/2013 | Miller |
| 9,034,527 B2 | 5/2015 | Budge |
| 9,421,516 B2 | 8/2016 | Alhooshani |
| 9,440,851 B2 | 9/2016 | Hwang |
| 9,515,338 B2 | 12/2016 | Budge |
| 9,640,822 B2 | 5/2017 | Budge |
| 10,626,790 B2 | 4/2020 | Hwang |
| 2001/0016184 A1 | 8/2001 | Campbell |
| 2001/0046462 A1 | 11/2001 | Woods |
| 2003/0039871 A1 | 2/2003 | Christen |
| 2004/0106837 A1 | 6/2004 | Lampert |
| 2004/0178124 A1 | 9/2004 | Liu |
| 2004/0180974 A1 | 9/2004 | Espinoza |
| 2005/0229488 A1 * | 10/2005 | Stevens ...................... B01J 8/02 48/198.7 |
| 2005/0268553 A1 | 12/2005 | Liu |
| 2006/0076270 A1 | 4/2006 | Poshusta |
| 2006/0130402 A1 * | 6/2006 | Wheat .................. B01D 53/047 48/197 R |
| 2006/0174941 A1 * | 8/2006 | Cohen ..................... B01F 3/028 137/93 |
| 2007/0237696 A1 | 10/2007 | Payton |
| 2007/0244208 A1 * | 10/2007 | Shulenberger ............ C01B 3/34 518/726 |
| 2007/0275278 A1 | 11/2007 | Hwang |
| 2008/0005963 A1 * | 1/2008 | Wheat ..................... C01B 3/382 48/61 |
| 2008/0032245 A1 | 2/2008 | Bushnell |
| 2008/0161428 A1 * | 7/2008 | Strait ...................... C01B 3/586 518/702 |
| 2008/0220300 A1 | 9/2008 | Jones |
| 2009/0035192 A1 * | 2/2009 | Hwang .................. B01D 53/90 422/170 |
| 2009/0266772 A1 | 10/2009 | Martinez De La Ossa Fernandez |
| 2010/0062925 A1 | 3/2010 | Morton |
| 2011/0023453 A1 | 2/2011 | Lucka |
| 2011/0041815 A1 | 2/2011 | Henriksson |
| 2011/0067382 A1 | 3/2011 | Federle |
| 2012/0067304 A1 | 3/2012 | Littmann |
| 2013/0174485 A1 | 7/2013 | Roychoudhury |
| 2013/0209338 A1 | 8/2013 | Prasad |
| 2014/0017583 A1 | 1/2014 | Roychoudhury |
| 2020/0116082 A9 | 4/2020 | Hwang |

OTHER PUBLICATIONS

Bromberg, L. et al., Diesel Engine Emission Workshop, Newport, RI Aug. 24-28, 2003.
Deluga,G.A. et al., Science vol. 303, p. 993, 2004.
Salge, J.R. et al., Science vol. 314, p. 801, 2006.
Department of Energy; Office of transportation Technologies; Onboard production of hydrogen fuel for improving internal combustion engine vehicles; Plasmatron Fuel Converter ; Dec. 2001.
Thomas Giroux et al.; Monolithic structures as alternatives to particulate catalysts for the reforming of hydrocarbons for hydrogen generation; Applied Catalysis B: Environmental 55 (2005) 185-200; Feb. 6, 2004.
D.R. Cohn, Fusion Power Assoc. Meeting, Nov. 21, 2003.
G. Voecks "Unconventional Utilization of Monolithic Catalysts for Gas-Phase Reactions",Jet Propulsion Laboratory, Pasadena, California; Marcel Dekker, Inc. p. 179-206(1998).
Hwang, 2006 NATPA Annual Conference, Newark, California, Jul. 29, 2006.

* cited by examiner

FLEX-FUEL HYDROGEN REFORMER FOR IC ENGINES AND GAS TURBINES

CROSS-REFERENCE TO RELATED APPLICATIONS

This application claims priority under 35 U.S.C. § 119(e) to U.S. Provisional Patent Application No. 61/688,853 filed May 23, 2012 and priority under 35 U.S.C. § 120 to U.S. patent application Ser. No. 13/900,479 filed May 22, 2013. The foregoing applications are incorporated by reference herein.

BACKGROUND OF THE INVENTION

Internal Combustion Engines and Gas Turbines

In the 20th century, various types of internal combustion (IC) engines and gas turbines have successfully been developed, and have been widely used over the years in the stationary power generation, transportation and utility applications. For example, the 2-stroke and 4-stroke gasoline engines are used for motorcycle, chainsaw, lawn mower, weed eater, automobile, small power generator etc, the diesel engines are used for truck, bus, stationary power generator etc, and the gas turbines are used for airplanes, power generators etc. Currently, most of the IC engines and gas turbines utilize homogeneous flame combustion of various hydrocarbons (HC) to generate power, and it is known that the ignition timing, the composition of the fuel/air mixture, the vaporization of the fuels, and the temperature and pressure at the moment of ignition are very important for a complete combustion. However, despite all the necessary controls and the technology advances over the years, any internal combustion engine or gas turbine will still emit pollutants such as unburned hydrocarbons, CO, $NO_x$, diesel particulates etc.

Currently, to reduce the HC, CO, $NO_x$ and diesel particulate pollutants from the IC engine's exhaust gas, catalytic converters, $NO_x$ traps and/or diesel particulate traps, which contains supported monolithic Pt group metal catalysts, have successfully been used commercially for several decades. For this pollution removing technology, an on-board microprocessor/computer (i.e. Emission Control Unit—ECU) as well as various electronic and mechanical devices/sensors are used to reduce the pollutants by controlling the air/fuel ratio and the ignition timing of the combustion gas.

Various other types of IC engines have also been developed successfully in recent years, and these engines can use different fuels such as hydrogen, natural gas, liquefied propane gas (LPG), gasoline/ethanol mixture (gasohol), diesel/bio-diesel mixture etc.

Hydrogen—Hydrocarbon Mixture as Engine Fuel:

To reduce the automobile's pollution, U.S. Pat. Nos. 3,955,941, 3,971,847, 3,982,910, 4,033,133, herein incorporated by reference, had invented several on-board reformers in the 1970s for producing $H_2$ from gasoline. The produced reformate was then mixed with additional amount of gasoline and air to form a very lean fuel mixture, and this mixture was then injected into an engine to perform lean combustion inside the combustion chambers. However, by using either homogeneous partial oxidation reactions or by using very low activity catalysts to produce $H_2$ from gasoline, these on-board reformers were bulky and also could not avoid coke formation in the reaction zones.

To improve engine's thermal efficiency and reduce automobile's pollution, several other patents and technical reports/publications had also attempted to produce $H_2$ from fuels by various catalytic processes. For example, U.S. Pat. Nos. 5,947,063, 3,915,125 and 4,109,461, herein incorporated by reference, described various on-board reformers to produce $H_2$ and CO gas from gasoline by catalytic partial oxidation reactions. U.S. Pat. No. 4,567,857, herein incorporated by reference, described a reformer to produce $H_2$ and CO catalytically by methanol steam reforming reaction. However, these pre-engine hydrogen reformers have not successfully been developed as commercial products, probably due to coking formation inside the bulky reformer. Instead, various types of catalytic converters, which are installed in the exhaust pipe after the engine, have commercially been used successfully to reduce the automobile's pollution since 1975.

Hydrogen can also be produced by another non-catalytic process. In U.S. Pat. Nos. 5,425,332, 7,028,644 and 7,225,787, herein incorporated by reference, an on-board Plasmatron fuel processor can generate electrically conducting gas (plasma), which can initiate non-catalytic partial oxidation reactions of various HC and bio-fuels to produce hydrogen for an IC engines. By mixing this reformate gas with the engine's inlet air stream, the engine can be operated in the ultra lean mode at a higher compression ratio (D. R. Cohn, Fusion Power Assoc. Meeting, Nov. 21, 2003). Thus, it was reported that this on-board Plasmatron fuel process can increase engine's efficiency by 20-25%, reduce NOx emission up to 90% and decrease diesel engine's exhaust emission by 90% (Diamond and Cohn, Office of Transportation Technologies, press release December 2001).

U.S. Pat. No. 7,721,682, herein incorporated by reference, describes a system and a method for producing, dispensing, using and monitoring a $H_2$ enriched natural gas (i.e. "Hythane") as engine fuels. This pre-mixed high pressure Hythane gas, which is available from a storage vessel at some local vehicle refueling stations, has recently been used to reduce $NO_x$ emission and to improve engine's combustion efficiency of diesel trucks.

In the last several decades, new technologies, which can produce hydrogen from HC/bio-fuels over the advanced Pt group metal catalysts under very high space velocity conditions, have successfully been developed for several different types of fuel cell applications. Therefore, a specifically designed economic and compact on-board hydrogen reforming apparatus, which utilizes these new advanced catalysts and new hydrogen production technologies with the powerful microprocessor controllers, sensors and other special devices, can effectively improve the patented on-board hydrogen reformers and the steady state fuel cell $H_2$ reformers as described previously. In other words, a new improved on-board hydrogen reforming apparatus, which is equipped with new devices and the new control strategy designed specifically for the engine's transient operation mode, can have long reformer life without coke formation, and can successfully produce hydrogen from hydrocarbons and/or bio-fuels efficiently and effectively for IC engines/gas turbines.

The Brown Gas (HHO or $H_2/O_2$ Gas):

In recent years, the Brown gas (or so called HHO gas, www.hydrogen-boost.com, www.hydrogen-generators-usa-.com, US 2012/0067304 A1), which is the $H_2$ and $O_2$ gas mixture generated by the electrolysis of distilled water, has been added to the air/fuel mixture of a gasoline or a diesel truck engine as a supplemental fuel. With the help of some specially designed IC chips, sensors and flow controllers, the air/fuel ratio of the engine's inlet fuel mixture can be adjusted away from the stoichiometric condition and allow the IC engine to be operated in the lean combustion mode.

By doing so, it is claimed that the engine's fuel mileage can be improved by 15-20% and can reduce the pollutions.

However, the corrosive nature of the KOH or NaOH electrolyte can potentially cause permanent damage to the engines. Therefore, in order to have a long term trouble free operation, the level and the concentration of the electrolyte, the electrolyte's operating temperature and the safe operation of this combustible and potentially explosive Brown Gas must constantly be monitored and maintained.

Catalytic EGR Oxidizer for IC Engines and Gas Turbines:

For the purpose of assisting and improving the combustion efficiency of an IC engine and/or a gas turbine, U.S. Pat. No. 8,061,120, herein incorporated by reference, describes a process of generating $H_2$/CO gas from various HC fuels and bio-fuels by an on-board EGR Oxidizer, which is a catalytic autothermal (ATR) reformer. The primary purpose of this patent is to use a catalytic reformer to replace the non-catalytic Plasmatron reformer for the mobile vehicle application.

According to this patent, a fuel mixture comprising hydrocarbons (HC) and/or bio-fuels, water/steam, air and portion of the engine's recycle exhaust gas is injected into an EGR Oxidizer. This fuel mixture is subsequently reacted over Pt group metal catalysts (pgm) inside the EGR Oxidizer's first reaction zone to produce a high pressure reformate containing steam, $H_2$, CO, $CO_2$, $N_2$, $O_2$ and unconverted HC. To improve catalyst's durability and life without coke formation, the $O_2$/C, $H_2O$/C and $CO_2$/C ratios of the inlet feed stream must be controlled individually and/or simultaneously within a specific range (or limits) at a given reaction temperature and pressure, and also to keep the ATR reaction zone's temperature continuously between 150 and 1200° C. The reformate so produced is then combined with additional amount of fuels and fresh air to form a lean fuel mixture, and all fuels and combustible compounds in this mixture will be completely converted into $CO_2$ and steam by a downstream engine/gas turbine.

A combination of an EGR Oxidizer and an IC engine/gas turbine can be used by itself as a driving device, or they can be combined with an electric generator and a battery bank to produce and store electricity as a distributed mobile or a small stationary power generator.

For diesel and lean burn engines, the EGR Oxidizer can also be used to provide reducing gases to regenerate the catalysts used in the $NO_x$ or diesel particulate filter traps. After regeneration, the traps can continuously be used to reduce emissions from an IC engine, diesel truck, gas turbine, power plant etc Electronic Fuel Injection:

By precisely controlling the amount of fuel injected, the ignition timings, and the air/fuel ratio of the fuel mixture, electronic fuel injection (EFI) has commercially been adopted for almost every automobile since 1990. With the EFI system, every automobile can improve its gasoline mileage and reduce the pollutants.

To improve further the engine's thermal efficiency, U.S. Pat. Nos. 8,091,536 and 8,396,644, herein incorporated by reference, have developed duel fuel injecting system for injecting both $H_2$ and HC into the combustion chambers. Especially, U.S. Pat. No. 8,396,644 has described a system and the detailed control strategy for injecting the calculated amount of $H_2$/reformate from a storage tank and/or from a reformer into a truck engine as the second fuel. However, the details of the reformer's operations, such as the process, catalysts and the reaction temperature, for producing reformate from fuels were not reveled in this patent. Furthermore, since the reformer's operation as discussed in this patent is directly related to the engine's speed and torque (paragraph #0186), there is a high tendency to form coke inside the reformer during the transient unsteady state operation, especially if diesel oil is used as the reformer's fuel.

Regeneration of $NO_x$ Trap and Diesel Particulate Filter:

For lean burn diesel engines, the $NO_x$ trap and the particulate filter are used to removed the pollutants. But, when the trap materials and/or the filter have reached their saturation level, they are required to be regenerated with a reducing gas so that they can be used continuously. To produce reducing gases, WO01/34950 and U.S. Pat. Nos. 5,441,401, 5,586,433, 6,845,610 and 7,610,752, herein incorporated by reference, have developed various devices and methods for producing H2 and CO catalytically by reforming diesel oil over various types of catalysts. In addition, a non-catalytic Plasmatron fuel processor as discussed previously can also produce $H_2$ rich reformate by the plasma partial oxidation reactions (Bromberg et al., Diesel Engine Emission Reduction Workshop, Newport, R.I., Aug. 24-28, 2003). However, these on-board reformers have not been widely used commercially, probably due to coke formation and/or their short useful life during the applications.

BRIEF SUMMARY OF THE INVENTION

U.S. Pat. No. 8,061,120 describes a process for producing $H_2$ and CO from various fuels by an on-board Catalytic EGR Oxidizer for IC engines/gas turbines. Using the same ATR reforming process, this newly invented on-board Flex-Fuel $H_2$ reforming apparatus provides several practical devices and new methods of operating these devices for generating $H_2$ and CO reformate from hydrocarbons (HC) and bio-fuels. The improved on-board Flex-Fuel $H_2$ reforming apparatus can be self-started without using any external heat and power sources, and the produced high pressure reformate is stored in several vessels. Then, this product gas from the storage vessels can be used to improve combustion efficiency of an IC engine/gas turbine, to regenerate catalysts in the $NO_x$/diesel particulate filter traps and to provide $H_2$ for other mobile or small stationary applications.

This on-board Flex-Fuel $H_2$ reforming apparatus provides devices and the methods of operating these devices comprising: (a). Providing one or more parallel autothermal (ATR) reformers for producing $H_2$ and CO from hydrocarbons and/or bio-fuels over supported and/or unsupported Pt group catalysts; (b). Providing one automatic control system comprising a control computer and/or microprocessors, flow meters/controllers, valves, pumps, sensors and thermocouples; (c). Providing a stream of the ATR reformer's inlet fuel mixture comprising at least one oxidant, at least one fuel and at least one water/steam selected from the reactant supply group consisting of liquid fuel loop, gas fuel loop, water supply loop, air supply loop, water electrolyzer loop, exhaust gas recycle (EGR) loop, water recycle loop and reformate recycle loop; (d). Reacting said stream of the inlet fuel mixture over said catalysts inside the ATR reformer to produce a reformate containing $H_2$ and CO from said fuels, and simultaneously controlling said fuel mixture's $O_2$/C, $H_2O$/C and $CO_2$/C ratios within a given range so that the maximum ATR reaction temperature is kept constantly below 1200°; (e). Providing one or more vessels/manifolds for storing the condensed water for the reformers and also the produced dry reformate from the ATR reformers between 1 to 100 atmospheres for the downstream IC engine/gas turbines and/or fuel cell devices; (f). Providing one or more flow control curves for regulating each reactant's flow rate, the dry reformate composition and the total reformer's flow output by the pressure of the storage vessels, wherein the control curves which are stored in the control computer and/or in the microprocessors should provide precisely an inlet fuel mixture to the reformers at the specified $O_2/C$, $H_2O/C$ and $CO_2/C$ ratios, and (g). Reacting the start-up reactants over the catalysts to start or re-start rapidly the ATR reformers without external heat and electricity, wherein two or more start-up reactants are selected from the group consisting of fuels, air, the engine/gas turbine's recycle exhaust gas, the $H_2/O_2$ gases from the electrolyzer, and the recycle reformate.

Depending on the pressure of the reformate storage vessels and the control curves, the automatic control system is capable of downloading a group of flow requirements (i.e. a group of flow set points) to all flow controllers to regulate simultaneously each reactant's flow rate. Thus, it can provide a specified fuel mixture to the ATR reformers by blending all the reactants together as a single fuel mixture stream. To avoid coking, deactivating or even melting of the catalysts, the $O_2/C$, $H_2O/C$ and $CO_2/C$ ratios of the inlet fuel mixture must be maintained constantly within the specified limits, so that the maximum reactor temperature of each ATR reformer can constantly be controlled below 1200° C. (preferably <1000° C.). In addition, while keeping at the same specified $O_2/C$, $H_2O/C$ and $CO_2/C$ ratios, the control system can instantly and precisely download a new set of flow requirements to all flow controllers during the operation, and each flow controller will proportionally increase/decrease its flow rate. Thus, the ATR reformers can quickly increase/decrease the total amount of reformate with the same gas composition to keep the pressure of the storage vessels within 1 to 100 atmosphere.

For mobile applications, the engine's $H_2$ demand can fluctuate widely due to idling and full speed operating conditions. Since the total amount of reformate generated by the reformers is automatically controlled by the pressure of the storage vessels and is not directly controlled by the engine's speed/load, the reformers can mostly be operated under steady state conditions, and they can smoothly changed from one steady state to the next condition without being directly influenced by the engine's speed/load. In other words, this new operating control strategy is to minimize and/or to avoid any momentary and frequently sudden fluctuations of the $O_2/C$ and $H_2O/C$ ratios in the reformer's inlet gas composition, so that it can prevent coke formation inside the reformers and, thus, can extend the Flex-Fuel $H_2$ reforming apparatus's durability and service life.

For a pressurized ATR reactor system used in the mobile applications where space is limited, it is advantageous to use multiple small diameter reformers to replace a single large diameter reformer, because the multiple small reactors for a high pressure system are cheaper to make, easier to maintain/replace/repair, and their flexibility in operation can satisfy the engine's reformate requirements without operating the reformers under unsteady state and coke formation conditions. Furthermore, since the inlet fuel mixture under O2/C<0.5 is mostly combustible and potentially explosive, it is important to use proper fuel injectors and also to minimize the total amount of fuel mixture injected into a reformer, so that any damages caused by system malfunctions can safely be reduced. For these reasons, this on-board Flex-Fuel $H_2$ reforming apparatus comprises one or more parallel ATR reformers in the system. However, since each ATR reformer in the system can independently be operated by the control system automatically, the following discussion for a single reformer can apply equally well to each ATR reformer in the system.

Every ATR reformer in the system contains three reaction zones—the first autothermal (i.e. catalytic partial oxidation/steam reforming—CPO/SR) zone, the second steam reforming (SR) zone and the third water gas shift (WGS) zone. A stream of fuel mixture with proper gas composition is introduced into the inlet of the ATR reformer's first reaction zone, and the produced reformate containing $H_2$ and CO will exit from the outlet of the reformer's third reaction zone. For this Flex-Fuel $H_2$ reforming apparatus, the inlet fuel mixture to the ATR reformers comprises mainly $O_2$, water and fuel, and this fuel mixture may or may not contain inert gases such as $N_2$ and $CO_2$. Briefly, the water source can come from a water tank or from a water recycle loop; The fuel source can be one or more components selected from the group consisting of any gaseous/liquid hydrocarbons and/or bio-fuels; The $O_2$ source can be $O_2$ from air, $O_2$ from a water electrolyzer, $O_2$ from an engine/turbine's exhaust gas recycle loop, or $O_2$ from a mixture containing >10% oxygen by combining together at least two of the above three oxygen sources.

Each ATR reformer in the Flex-Fuel $H_2$ reforming apparatus system is capable of performing the following steps: (1). Receiving a stream of inlet fuel mixture consisting of water, one or more fuels and $O_2$ containing gas with or without diluents in a given range of $O_2/C$, $H_2O/C$ and $CO_2/C$ ratios into the reformer's first CPO/SR reaction zone; (2). Reacting said inlet fuel mixture over Pt group metal catalysts with a residence time <300 milliseconds (calculated at STP) in the first CPO/SR reaction zone; (3). Reacting further the fuel and reformate mixture from step 1 over Pt group metal catalysts with a residence time <5 seconds in the second SR reaction zone; (4). Producing rapidly in steps 2 and 3 a reformate stream comprising of steam, $H_2$, CO, $CO_2$, $N_2$, $O_2$ and unconverted fuels at a given temperatures between 150-1200° C. and a given pressure between 1 to 100 atmosphere, and (5). Feeding the produced reformate stream from step 4 into the reformer's third reaction zone with a residence time <100 seconds and then converting portion of the feed water and CO into hydrogen with or without Pt group metal catalyst at a temperatures between 50 to 500° C. After the reformers, the produced ATR reformate can be cooled by a heat exchanger, the condensed water will then be stored in a water tank and the dry gas will be compressed and stored in one or more storage vessels at a pressure between 1 to 100 atmospheres.

The stored/accumulated high pressure reformate in the storage vessels can be used as followings: (1). Combine the reformate with additional amount of fuels and fresh air to form a lean fuel mixture as engine/gas turbine's fuel source; (2). Provide $H_2$ to generate the oxidation reaction heat over the catalysts to start up the reformer quickly from room temperature; (3). Provide $H_2$ to reduce the supported Pt group metal catalysts or to regenerate catalysts in the catalytic converters, $NO_x$ traps, diesel particulate filters etc.; (4). Provide $H_2$ to a mobile vehicle/device equipped with a solid oxide or proton exchange membrane fuel cell stack for generating electricity, and (5). Provide reformate to a small diesel engine and/or a catalytic combustor to supply both heat and power as an On-board Auxiliary Power Unit. Here, the APU is a small IC engine/gas turbine or a combustion device, which can provide both heat and electricity to a small local area when a large diesel engine or when a large stationary back-up power generator is not in operation. For example, U.S. Pat. No. 8,397,509 provides a combination of one catalytic combustor and one steam/gas turbine system to generate heat and electricity.

Depending on the final application, the size/volume of each ATR reformer's reaction zones can be adjusted to provide a reformate with the appropriate gas composition for the downstream equipments. For example, a compact reformer containing only the catalyst in the first CPO/SR catalyst zone can satisfactorily provide a reformate comprising $H_2$, CO and some unconverted fuels for a downstream IC engine/gas turbine; A proper volume combination of CPO/SR, SR and WGS catalysts in their respective reaction zones can completely convert all the hydrocarbons and/or bio-fuels to produce a reformate comprising the maximum % $H_2$ and the minimum % CO, and this reformate can be used to regenerate catalysts in the pollution traps. If necessary, this $H_2$ rich reformate can also be used as a small hydrogen station for a distributed fuel cell power generator, and/or as the only fuel source for a reformate IC engine/gas turbine.

The fuels mentioned here can be any chemicals selected from one or more of the following compounds: $C_1$-$C_{16}$ hydrocarbons, methane, natural gas, methane hydrate, LPG, $C_1$-$C_8$ alcohols, vegetable oils, bio-ethanol, bio-diesel, bio-methane, the industrial waste or vent gas containing volatile organic compounds (i.e. VOC, mainly organic solvents), and any bio-fuels derived from biomass or from agriculture/industrial/animal wastes. In theory, the ATR reformer's fuel candidates can be any gaseous fuels, liquid fuels or a combination of any fuel mixtures which can eventually be vaporized and catalytically be oxidized over the Pt group metal catalysts to produce hydrogen and CO by the autothermal reforming reactions.

Each ATR reformer's reaction zone includes one or more supported Pt group metal (pgm) powder (i.e. washcoats) catalysts, and each catalyzed washcoat contains between 0.01 to 10.0 wt % of total Pt group metals supported on metal oxide powders. The term "supported Pt group metal powder catalyst" refers to one or more of Pt, Pd, Rh, Ir, Os, and/or Ru metals which are first impregnated on one or more washcoat powders selected from the group consisting of $Al_2O_3$, Ce oxide, Zr oxides, Ce—Zr oxide composite, oxide promoters/thermal stabilizers and mixture thereof. Here, the oxide promoters/stabilizers can be one or more oxides of lanthanum, cerium, praseodymium, Rhenium, Zinc, Tin, calcium, potassium, zirconium, yttrium, barium, strontium, magnesium and mixture thereof. Subsequently, the catalyzed washcoat powder is then coated on the surface of an high temperature inert carrier to obtain the total Pt group metal loading of 0.1 to 2000 g/ft$^3$ of the catalyst volume, and the inert carrier can be a ceramic monolith, metallic monolith, pellet, wire mesh, screen, foam, plate, silicon carbide etc. For the mobile devices/equipments, monolithic catalysts are preferred. But the monolith, pellet, gauze, wire mesh, screen, foam, plate, static mixer, heat exchanger or other shapes of catalyst's supports can satisfactory be used for stationary devices/equipments.

To be used as the catalyzed washcoat support, the inert materials must be capable of sustaining a temperature between 500° C. to 1100° C. without losing its strength and shape. For example, the inert ceramic substrate can be made of alumina, alumina-silica, alumina-silica-titania, mullite, cordierite, zirconia, zirconia-ceria, zirconia spinel, zirconia-mullite or silicon carbide, and the metallic substrate can be made of Fecralloy, Kanthal, stainless steel and other high temperature alloys.

To improve the catalyst's durability and the operating life, it is necessary to optimize and control individually or simultaneously the % fuels, and the $H_2O/C$, $CO_2/C$ and $O_2/C$ ratios of the feed mixture within the specified range (i.e. limits), so that the reactor's catalyst temperature is constantly kept below 1200° C. (preferably <1000° C.). For example, to maintain the catalyst's temperature below 1200° C. without coke formation/accumulation, the $H_2O/C$ ratio of the inlet fuel mixture is preferably kept between 0.05 and 10.0, the $O_2/C$ ratio between 0.15 to 0.8, and the $CO_2/C$ ratio between 0.0 and 0.5. However, since a given hydrocarbon or bio-fuel has its own boiling point, heat of vaporization, heat of oxidation reactions, tendency to form coke, rates of catalytic partial oxidation reactions, rates of steam reforming reactions etc, the optimized operating $H_2O/C$, $CO_2/C$ and $O_2/C$ ratios for the ATR's inlet fuel mixture will strongly depend on the type of fuels, the catalysts and the reaction temperature and pressure. For example, the bio-methane is composed of approximately 60% methane and 40% $CO_2$, a fuel mixture comprising low $O_2/C$ ratio and high $CO_2/C$ ratio can still be able to keep the catalyst's temperature below 1200° C. because of high heat capacity of $CO_2$. In other words, the $H_2O/C$, $CO_2/C$ and $O_2/C$ ratios for the ATR's inlet fuel mixture are controlled in a given range so that the ATR reformer's maximum reaction temperature is always below 1200° C.

To assist the homogeneous combustion inside an IC engine/gas turbine, the reformate coming out of the ATR reformer can be mixed directly with additional amount of fuels and fresh air/oxidant as part of the engine/turbine's lean fuel mixture. However, for transient operations which are frequently found in mobile, stationary or special applications, it is preferred to store the produced reformate in high pressure vessels before admitting it into an engine/turbine. For this process arrangement, the ATR reformer's main function is to produce enough reformate to keep the storage vessels within a pressure range between 1 to 100 atmospheres, and the engine/turbine's hydrogen requirement can then be withdrawn from the storage vessels. In other words, the reformate's storage vessels can act as a buffer, the ATR reformer's operation is directly controlled by the storage vessels' reformate pressure, and it is not necessary for the ATR reformer to response directly and spontaneously to any frequently sudden changes in the engine/turbine's speed/load. Thus, the storage vessels allow the reformers to change from one steady state operating condition to the next condition smoothly.

In order to have instantaneous control, recording and monitoring of the fuel ratios, the Flex-Fuel $H_2$ reforming apparatus is required to equip with necessary sensors, on/off valves, pumps, thermocouples, flow meters/controllers and either a programmable logic controller (PLC) or a microprocessor. Furthermore, a personal computer (PC) can be used to program and to communicate with the PLC/microprocessor. However, if a PC or a powerful microprocessor is equipped itself with the necessary input/output interface modules, it can be used to control and monitor directly the Flex-Fuel $H_2$ reforming apparatus.

For mobile applications, the water condensed from the ATR's reformate can be recycled back to the ATR's inlet feed mixture so that a mobile vehicle does not have to carry a big water tank. Furthermore, to start up the Flex-Fuel $H_2$ reforming apparatus from room temperature, the engine's recycled exhaust gas can be used to provide heat, $O_2$ and steam to initiate the oxidation reactions, especially if the ATR's inlet fuel mixture comprises at least one low temperature light-off fuel component. Furthermore, to start or re-start an ATR reformer rapidly, the recycled reformate from the storage vessels and/or the $H_2/O_2$ gases from the water electrolyzer can also be used to initiate and to accelerate the oxidation reactions of other fuels. Since hydrogen-oxygen reaction can proceed over the Pt group metal catalyst at room temperature, the oxidation reaction heat can rapidly increase the catalyst above the light-off temperatures and, thus, can initiate the oxidation reactions of other fuels without using any external heating devices. Note that the light-off temperature is the minimum temperature required to sustain the catalytic partial oxidation reaction of a given fuel spontaneously without using any external heat sources.

The third reaction zone of this ATR reformer can be used to convert water and CO to produce $H_2$ at a slower space velocity by the water gas shift reaction. For this reaction zone, the Pt group metal catalysts, which are supported on oxides such as $Al_2O_3$, Ce/Zr Oxides, oxide thermal stabilizer/promoters and mixture thereof, are preferred. Here, the oxide thermal stabilizer/promoters can be one or more oxides of lanthanum, cerium, praseodymium, rhenium, calcium, zirconium, yttrium, barium, strontium, magnesium, zinc, potassium, copper, iron, cobalt, nickel, chromium, tin, gold, silver and mixture thereof. But the traditional Cu/Zn oxide and/or Fe/Cr oxide catalysts can also be used in this reaction zone to increase the % $H_2$ and decrease the % CO in the reformate gas. However, when a catalyst is not present in this third reaction zone, the non-catalytic water gas shift reaction will also occur thermodynamically, but with slower reaction rate. Therefore, for the purpose of regenerating a catalyst without CO emission, the reformer should contain SR and WGS catalysts inside the reaction zones, and a catalytic converter containing Pt group metal catalyst can be used to reduce CO emission after the $NO_x$ trap/diesel particulate filter.

As described previously, when hydrogen is added to the inlet fuel mixture, engine can be adjusted to perform lean combustion instead of the current near stoichiometric combustion. In addition, by combining the lean air/fuel mixture with a turbo charger, an engine can increase its compression ratio and can improve its thermal efficiency further by performing lean combustion at a higher pressure. Since the exhaust gas of a lean burn engine comprises mainly $N_2$, $O_2$, $CO_2$ and steam, re-circulating the lean exhaust gas is an effective way to inject steam, $O_2$, $CO_2$ and heat into the ATR reformer. Therefore, the recycled exhaust gas can reduce the reformer's heat loss and can continuously keep the reactions inside the ATR's reaction zones without any external heat sources. Also, the steam and $CO_2$ in the recycled gas can absorb more reaction heats and reduce the reformer's peak temperature below <1200° C.

Portion of the electricity generated by this Flex-Fuel $H_2$ reforming apparatus can be used to produce HHO gases by the electrolyzer. However if a solar panel and/or a wind power generator are available, they can be used to supply electricity to perform electrolysis of distilled water. In this case, the $H_2$ produced by the electrolyzer is primarily used to initiate the catalytic partial oxidation reaction of fuels during the reformer's start-up period, and it can also be added directly to the reformate storage vessel as part of the engine's fuel mixture or be used to regenerate the $NO_x$ trap and/or diesel particulate filter; The amount and the flow rate of the $H_2/O_2$ produced by the electrolyzer, which is controlled by the pressure of the reformate storage vessel and the control curves, can be used directly as the ATR reformer's only oxygen source for the purpose of increasing the % $H_2$ in the ATR reformate, or it can be added to air or to the engine's recycled exhaust gas to increase the % $O_2$ content in the ATR reformer's inlet fuel mixture >10%.

As shown in FIG. 1, a system consisting of an on-board Flex-Fuel $H_2$ reforming apparatus and the engine/gas turbine can directly be used by itself as a driving device for general applications, such as automobile, lawn mower, fork lift truck, diesel truck, bus, train, motorcycle etc. If this Flex-Fuel $H_2$ reforming apparatus and the engine/gas turbine system is connected to an electric generator and a battery bank, it can generate and store electricity as a stand-alone mobile or stationary power station. This stand-alone distributed power station can be used to power electric vehicles/equipments, such as automobile, lawn mower, truck, forklift truck, bus, train, motorcycle, portable industrial/household electrical equipments/devices, electric utility vehicle, battery charger and backup power. Furthermore, the simplified Flex-Fuel $H_2$ reforming apparatus as shown in FIG. 2, FIG. 3, FIG. 4 and FIG. 5, which are designed to replace FIG. 1 for special simple applications, can be used to replace FIG. 1 in the driving device and/or in the distributed power station applications mentioned previously.

For special applications, this Flex-Fuel $H_2$ reforming apparatus can also provide $H_2$ or $H_2$ rich reformate directly to an IC engine/gas turbine as the only fuel source (i.e. a reformate engine/gas turbine), or it can be used as part of a small portable or mobile distributed hydrogen station for supplying $H_2$ to a fuel cell power generating unit, such as a solid oxide or a proton exchange membrane fuel cell system.

DETAILED DESCRIPTION OF THE INVENTION

Description of the Preferred Embodiments

Figure 1:
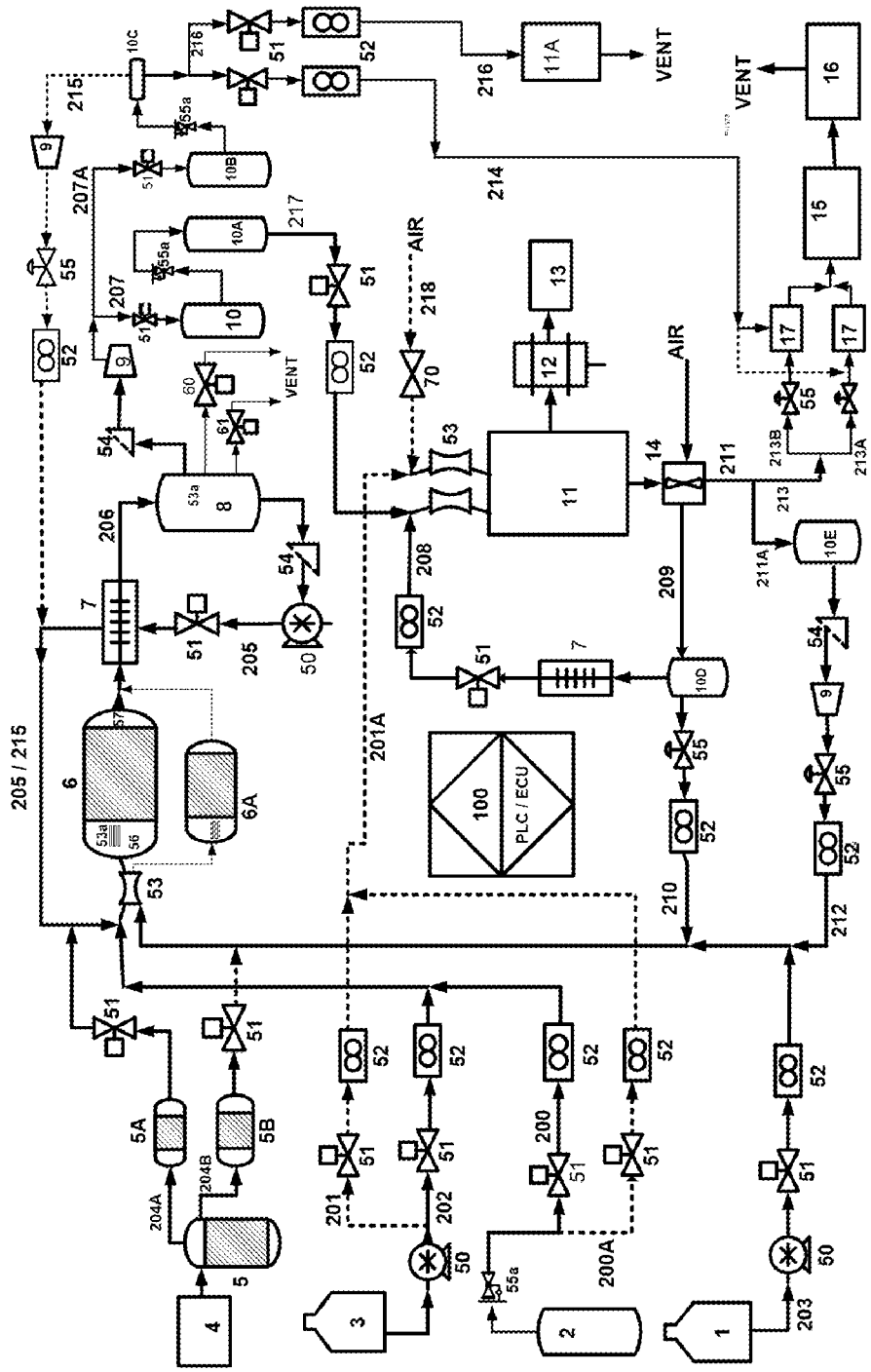
FIG. 1 is a schematic illustration of a general system comprising a Flex-Fuel $H_2$ Reforming apparatus, an IC engine/gas turbine and an electric generator in accordance with an exemplary embodiment of the present invention.

Traditionally, large scale hydrogen is produced industrially by performing steam reforming (SR) reactions of hydrocarbons over the Ni/Al$_2$O$_3$ pellet catalyst, and the reformer is commercially operated at a low space velocity (typically at 2,000-8,000/hr) under steady state high pressure conditions. Therefore, to supply H$_2$ to a mobile equipment or a distributed fuel cell power station, it is required to transport either liquid H$_2$ or high pressure H$_2$ gas from a long distance central plant and, then, store the H$_2$ in the local high pressure tanks for the applications. However, a more convenient approach to supply H$_2$ for these applications is to use a smaller distributed H$_2$ reformer, which can produce H$_2$ locally from various gaseous or liquid fuels. Since a mobile vehicle or a distributed fuel cell power station is typically operated on the power demand basis, an on-board or a distributed hydrogen reformer must be able to operate satisfactorily under frequent start-up, shutdown and other transient operating conditions.

Using the traditional H$_2$ production technologies, several small reformers were designed in the 1970s to convert sulfur containing diesel oil into H$_2$ for the phosphoric fuel cell application, and these reformers typically used metal oxide and/or Ni/Al$_2$O$_3$ pellet catalysts to perform the catalytic partial oxidation (CPO) and steam reforming (SR) reactions at a low space velocity. But, due to low catalytic activities at a slow space velocity, these reformers were generally bulky and they were not suitable to be used as an on-board reformer. An excellent summary of these hydrogen production technologies was written by G. Vocks ("Structured Catalysts and Reactors", edited by Cybulski and Moulijn, Marcel Dekker, Inc. Page 179 (1998)), herein incorporated by reference.

During the development of a new compact reformer in early 1980s, several monolithic Pt group metal catalysts were found to be able to produce H$_2$ and CO from a commercial sulfur containing #2 diesel oil at a very high space velocity. As shown in the DOE report (DE-AC-03-79-ET15383, September 1981), a new ATR reformer, which utilized several monolithic Pt/Pd CPO catalysts in the first reaction zone at a space velocity of 126,000/hr (18 milliseconds, calculated at 1 atm and 0° C.), can convert most of the fuels into H$_2$ and CO and, then, the unconverted fuels can be converted in the subsequent Pt/Rh SR pellet catalysts in the second reaction zone at a space velocity of 6,500/hr (i.e. 550 ms). Furthermore, it was later demonstrated that, under proper steady state operating conditions, this new improved ATR reformer could also successfully produce H$_2$ from diesel oil, gasoline, LPG and JP-4 fuels without coke formation.

As shown in Table 1, the total HC conversion of every fuel evaluated in these experiments was >=99% (dry basis), and the total % (H$_2$ and CO) produced was >50% under the O$_2$/C ratio of about 0.38 and H$_2$O/C ratio of about 2.50. Therefore, it can be concluded from these tests that this improved compact ATR reformer, which utilizes the monolithic Pt group metal catalysts, can successfully be used to produce H$_2$ from various hydrocarbon fuels under very high space velocity conditions.

The Pt group metal (pgm) catalysts used in these demonstration tests as described in Table 1 were prepared by impregnating first one or more of the Pt, Pd and/or Rh solutions at a given metal concentration into a thermally stabilized gama-Al$_2$O$_3$ washcoat powder, which had a surface area between 50 and 600 m$^2$/g. Here, the thermal stabilizers, which were used to maintain the surface area of the washcoat powder at high temperatures, comprise one or more oxides of lanthanum, cerium, praseodymium, rhenium, calcium, potassium, barium, yttrium, zirconium, strontium, magnesium and mixture thereof. Subsequently, the catalyzed washcoat powder was further coated on the surface of an inert monolith substrate, and then dried and calcined. The total combined metal content of each monolithic Pt group metal catalyst shown in Table 1 was typically between 0.10 to 2,000 g/ft$^3$.

Though the inert monolith substrate used in Table 1 was a ceramic cordierite which had 200 to 600 straight channels per square inch (CPI), other suitable catalyst carriers can be a ceramic or metallic monolith, foam, plate, gauze, wire mesh, static mixer etc. Here, the ceramic monolith can be porous materials comprising one or more metal oxides selected from the group consisting of alumina, alumina-silica, alumina-silica-titania, mullite, cordierite, zirconia, zirconia-spinal, zirconia mullite, silicon carbide etc.; The metallic monolith can be a heat and oxidation resistant alloy such as Fecralloy, Kanthal, stainless steel etc.

TABLE 1

Summary of autothermal reforming of hydrocarbons over Pt group metal (pgm) catalysts (Hwang et al. AiChe Annual Meeting, Los Angeles Ca, Nov. 5, 2000)

| | Hydrocarbon | | | |
|---|---|---|---|---|
| | LPG | LPG | Jet Fuel (JP-4) | No. 2 Diesel |
| | Run No. | | | |
| | II-41 | II-46 | II-48 | II-32 |
| Catalyst | | | | |
| CPO | CPO-2B (pgm) | CPO-2B (pgm) | CPO-2B (pgm) | CPO-2B (pgm) |
| S.R. | FP-34 (pgm) | FP-34 (pgm) | FP-34 (pgm) | FP-34 (pgm) |
| Condition | | | | |
| H$_2$O/C | 2.430 | 2.480 | 2.280 | 2.570 |
| O$_2$/C | 0.398 | 0.417 | 0.381 | 0.378 |
| Temperature (C.) | | | | |
| Inlet to CPO | 749 | 749 | 749 | 749 |
| S.R. TOP | 865 | 896 | 921 | 942 |
| S.R. MID | 717 | 751 | 777 | 809 |
| S.R. END | 696 | 729 | 758 | 778 |
| Dry Gas (%) | | | | |
| H$_2$ | 44.35 | 42.43 | 39.72 | 41.11 |
| CO | 9.94 | 10.09 | 12.49 | 11.52 |
| CO$_2$ | 12.19 | 12.17 | 12.18 | 12.51 |
| N$_2$ | 33.21 | 35.02 | 35.23 | 34.37 |
| CH$_4$ | 0.08 | 0.04 | 0.12 | 0.26 |
| Equivalent H$_2$ | 2.44 | 2.36 | 2.13 | 2.17 |
| HC Conv. (%) | 99.64 | 99.82 | 99.50 | 98.80 |

To produce hydrogen for fuel cell applications, U.S. Pat. No. 4,522,894 had concluded that the rates of partial oxidation reactions of diesel oil over the Pt group metal catalysts are much faster than that of the steam reforming reactions. In other words, at a the residence time <300 milliseconds, the % fuel conversion to make H$_2$ and CO is primarily controlled by the $O_2/C$ ratio of the feed mixture with minor contribution from the $H_2O/C$ ratio. However, the related experimental studies as well as the thermodynamic calculations (DOE #DE-AC-03-79-ET15383 (1981) and DOE #DE-AC-21-79-MC12734 (1981)) had also concluded that the autothermal reforming process, as compared to the catalytic partial oxidation process, could widen the operating $O_2/C$ ratios without coke formation, reduce the reactor's peak temperature, extend catalyst durability, minimize the catalyst deactivation and achieve longer reformer life. In other words, the autothermal reforming process is practically a better and a preferred process over the catalytic partial oxidation process for a compact durable reformer. For this reason, the patented on-board reformers developed in the 1970s can be improved for its durability and the operation life by replacing the CPO reforming process with the ATR reforming process over the more advanced Pt group reforming catalysts, and this new improved Flex-Fuel $H_2$ Reforming apparatus can be an effective and efficient on-board $H_2$ reforming apparatus for a mobile vehicle.

In the late 1990s, a small commercial reformer, which can convert all HC fuels with long durability at a space velocity at about 54,000/hr (i.e. about 67 ms at STP), was developed for a Proton Exchange Membrane fuel cell (PEMFC) electric generator. In this study, a new generation of advanced reforming catalysts and a revised compact ATR reformer design were developed for producing $H_2$ from natural gas and LPG. Briefly, a series of layered monolithic CPO/SR catalysts were developed to improve the steam reforming activities in the ATR reformer's first reaction zone. For these layered catalysts, a thin layer of the SR catalyst was first coated on the inert monolith surface and another layer of the CPO catalyst was then coated on top of the SR catalyst layer. With the intimate contact between these two catalyst layers, the heat producing CPO layer would generate and quickly provide the reaction heat for the endothermic SR layer without any heat transfer barriers. As shown in the U.S. Pat. Nos. 6,436,363 and 6,849,572, these new advanced catalysts, which were prepared with various multiple layered and/or with various metal gradient coating techniques, could achieve the most efficient utilization of the Pt group metals, could further improve the methane conversion, could reduce the reformer's volume, could reduce the reactor's peak temperature by about 50° C. and most importantly could provide a reformer with longer life without coke formation.

Using these advanced reforming catalysts, an improved smaller ATR reformer can be re-designed to produce $H_2$ from various hydrocarbons and/or bio-fuels as an on-board reforming unit. For example, a compact and an economic ATR reformer for a mobile equipment can utilize only the CPO/SR catalysts in the first reaction zone without using the SR and WGS catalysts in the second and third reaction zones. This reformer will convert portion of the fuels into $H_2$ and CO, and the remaining unconverted fuels and CO can be combusted by a downstream engine/gas turbine. However, for a stationary distributed power generator or for a small potable hydrogen station, the design and the operating conditions of an ATR reformer must be adjusted to produce maximum % $H_2$ and minimum % CO in the reformate. In this case, the ATR reformer should rely on the CPO/SR and SR catalysts in the first two reaction zones to convert all (i.e. 100%) of the fuels into $H_2$ and CO and, then, rely on the subsequent WGS catalyst in the third reaction zone to convert CO and $H_2O$ into $H_2$.

For this on-board Flex-Fuel $H_2$ Reforming apparatus, portion of the electricity generated by the electric generator as shown in FIG. 1 can be used by the water electrolyzer to produce pure $O_2$ and $H_2$. The produced $H_2$ can be used to heat up catalysts above the light-off temperatures and, thus, can rapidly initiate the CPO reactions of fuels during the start-up period; The produced $O_2$ can be used to increase the $O_2$ content in the recycled exhaust gas, can be used alone as an ATR's oxidant or can be used to enrich the combined ATR inlet fuel stream mixture to >10% $O_2$.

U.S. Pat. No. 5,648,582, herein incorporated by reference, described a process of using a millisecond (ms) reactor to produce synthesis gas successfully from methane over a metal supported catalyst at a very short residence time (SV=800,000 to 120,000/hr, or about 3 ms). Here, air and/or pure $O_2$ were used as oxidants for the CPO reaction, and the catalysts used in this millisecond reactor system were one or more of Rh, Ni, and Pt catalysts which were coated on the surface of a ceramic foam substrate, metal gauze or extrudate. Since 1990s, professor Schmidt and his group had successfully produced synthesis gas and olefins over mostly the ceramic Rh foam catalysts at millisecond contact time from methane, n-hexadecane, n-decane, JP-8, gasoline, diesel oil, ethanol, glycerol, vegetable oil, biodiesel, other volatile and non-volatile liquids etc. Several excellent patents and scientific papers have been published by this group in the last two decades. Overall, their studies have demonstrated that the volatile hydrocarbons and bio-fuels can easily be reformed catalytically into $H_2$, CO and olefins with high yields in an millisecond reactor system, and that the synthesis gas can be produced from various fuels by either catalytic partial oxidation or autothermal reforming reactions over the Rh containing catalysts, which were coated on gauzes, ceramic foams or $Al_2O_3$ spheres.

In the last two decades, a group at Argonne National Laboratory has also done some excellent studies in developing catalysts as well as developing the advanced CPO and autothermal reforming processes. For example, U.S. Pat. No. 6,110,861, herein incorporated by reference, described a newly developed two-part catalyst (i.e. 1% Pt/CeGdO pellet catalyst) which could effectively produce H2 from gasoline/natural gas, water and oxygen fuel mixture with the residence time of 0.1 to 2 seconds; U.S. Pat. No. 6,713,040, herein incorporated by reference, described the detailed design and operating procedure for a compact autothermal reformer to produce H2 from fuels for the fuel cell application. Overall, the studies by this group had also demonstrated that H2 could efficiently be produced from iso-Octane, cyclohexane, 2-pentene, ethanol, methanol, methane and other fuels over the newly developed Pt containing two-part catalyst by the autothermal reforming process.

Since 2000, a lot of excellent patents and scientific papers have been published by various groups worldwide on the catalytic partial oxidation and the autothermal reforming processes, and it is impossible to cite every study here. However, it is clear from these publications that the CPO and the ATR processes can effectively be used to produce $H_2$ and/or synthetic gas catalytically from various volatile hydrocarbons and bio-fuels under very high space velocity conditions (i.e. small reformer).

For industrial applications, the addition of water/steam to the reformer's inlet fuel mixture will convert a CPO reformer into an ATR reformer, and this ATR reformer which utilizes the advanced reforming catalysts can effectively be operated under wider range of the $O_2/C$ ratios without coke formation as a stationary $H_2$ reforming apparatus. Furthermore, to improve over this stationary $H_2$ reforming apparatus for mobile applications, an on-board Flex-Fuel $H_2$ reforming apparatus, which provides several practical devices and the method of operating these devices without external heat and electrical sources, can produce $H_2$ from various volatile hydrocarbons and/or bio-fuels for the IC engines/gas turbines.

Though most of the current gasoline IC engines are designed to operate stoichiometrically, the lean burn gasoline and/or diesel truck engines are becoming more popular in recent years. Since the lean burn IC engines will produce more $NO_x$ pollutant as compared to an engine running with a stoichiometric air/fuel mixture, a monolithic $NO_x$ trap is installed in the exhaust pipe to reduce the $NO_x$ emission from a lean burn gasoline engine. Similarly, a $NO_x$ trap and a diesel particulate filter are installed in the exhaust line to remove emissions from a lean burn diesel engine.

Typically, a $NO_x$ trap and a diesel particulate filter comprise some trap materials supported on a porous ceramic monolith, and the trap materials comprise a small % Pt group metals supported on an $Al_2O_3$ powder and one or more oxides of K, Na, Cs, Ba, La, Sr, Ca, Mg, Zn, Ce, Zr and the mixture thereof. However, each trap material has its own storage capacity, and it will not reduce the $NO_x$ or diesel particulate emissions once it is saturated. Therefore, these trap materials are required to be regenerated periodically by using an external reducing $H_2$ and/or CO gases, and the Flex-fuel $H_2$ Reforming apparatus can effectively produce this reducing gas for this application.

The IC engine/gas turbine can be started manually from room temperature to generate the hot exhaust gas, which is recycled back to heat up the ATR reformer and also to drive the electric generator to power up the PLC/ECU and all sensor/controllers. Once the electricity is generated, the whole system can be switched to the automatic operating mode and let the computer system operate the $H_2$ reforming apparatus automatically.

The combination of this Flex-Fuel $H_2$ Reforming apparatus and an IC engine/turbine can be used by itself as a driving device for a mobile device/equipment, such as lawn mower, chainsaw, motorcycle, fork lift truck, automobile, bus, truck and train; The combination of this Flex-Fuel $H_2$ Reforming apparatus, an IC engine/turbine, an electric generator and a battery bank can be a useful distributed and integrated electric generating system for an electric car, truck, train, motorcycle, forklift truck, electric utility vehicles, battery charger, backup power generator, and other stationary or mobile electric equipment/devices.

Exemplary Embodiments Described

The on-board Catalytic EGR oxidizer described in U.S. Pat. No. 8,061,120 teaches a process of producing $H_2$ and CO from various hydrocarbons and bio-fuels for the IC engines/gas turbines. To be a successful and durable reformer without coke formation and without catalyst deactivation and/or melting, the ATR reformer's reaction temperatures must be kept constantly <1200° C. (preferably <1000° C.), and the $O_2/C$ ratio of the reformer's inlet fuel mixture must be kept between 0.15 to 1.50, the $H_2O/C$ ration between 0.05 to 10.0 and the $CO_2/C$ ratio between 0.00 to 0.50. To improve over this Catalytic EGR Oxidizer, an on-board Flex-Fuel Hydrogen Reforming apparatus as shown in FIG. 1 is designed, and this on-board reforming apparatus can provide practical devices and the method of operating these devices primarily for mobile vehicles and/or distributed electrical generators where external power and water sources are limited. Furthermore, using the teachings of the present invention, potential simplified on-board Flex-Fuel $H_2$ Reforming apparatuses and/or other various system configurations are available to one skilled in the art and, as examples, several simplified Flex-Fuel $H_2$ Reforming apparatuses are included here for various specific applications.

Contrary to a steady state fuel cell reformer, a successfully on-board reformer must be able to convert fuels into $H_2$ without coke formation under rapid transient (i.e. fast acceleration/deceleration), frequent start-up/shut down, steady state and other unsteady state operating conditions. Also, it must be able to perform autothermal reforming without any external power and water source, and the reformers must be able to be re-started very quickly with the system's own heat and electricity. Therefore, this Flex-fuel $H_2$ Reforming apparatus is designed to provide several reactant supply paths (loops) for injecting the necessary reactants into an ATR reformer. Here, the reactant supply paths include a water loop, a gaseous fuel loop, a liquid fuel loop, a water electrolyzer loop, a recycle water loop, a recycle reformate loop, a recycle exhaust gas loop, and two air supply loops. Briefly, the controlled amount of at least one fuel, one oxidant and one water/steam from the reactant supply loops are injected into the ATR reformers for converting the fuels over the Pt group metal catalysts into a reformate containing $H_2$ and CO. The produced reformate will be cooled, the condensed water will be recycled as one of the ATR reactant and the dry gas will be compressed and stored in one or more high pressure storage vessels. As described previously, the pressure of the reformate in the storage vessel is the primary feedback signal which is used to regulate the flow rate of each reactant according to the predefined control curve. Thus, this pressure signal is used to increase or decrease the total amount of the reformate output produced by the ATR reformers, so that the reformate pressure in the storage tanks can be maintain between 30 to 100 atmospheres. In other words, as the pressure of the stored vessels decreases, each reactant's flow rate, while keeping under the same $O_2/C$, $H_2O/C$ and $CO_2/C$ ratios, will be proportionally increased and more reformate with the same gas composition will be produced by the reformer to keep the vessels' pressure within the limits. However, when the pressure is closer to 100 atmosphere, one or more ATR reformers will be operated at a reduced flow capacity, stayed in the idle mode or even shut down to decrease the total amount of reformate output to the storage vessels. Due to the fact that the ATR reformers may get shut down during the operation, it is very important that the reformers can be re-started very quickly with the system's own heat and electricity. Furthermore, this Flex-Fuel reforming apparatus is typically operated at a temperature between 650° to 1000° C., and it can be used to generate hot water and hot air in a downstream condenser as one part of a combined heat and power generator.

To produce a $H_2$ rich reformate, the ATR reformer's inlet fuel mixture is preferred to be controlled at O2/C<0.5. However, this fuel rich mixture is mostly combustible and potentially explosive, it is thus very important to use proper fuel injectors for each reformer and also to minimize the total amount of fuel mixture injected into a reformer, so that any damages caused by system malfunctions can safely be reduced. For these reasons, this on-board Flex-Fuel $H_2$ reforming apparatus comprises one or more parallel ATR reformers instead of a single large reformer.

The dry reformate is compressed and stored in vessels #10 and #10B at a pressure between 30 to 100 atmosphere, and the reformate is then reduced by a regulator #55a to a lower pressure between 1 to 50 atmosphere in flow manifolds #10A or 10C. Here, the controlled amount of the reformate in manifold #10A (stream #217) and the secondary air (stream #208) are mixed with proper amount of primary fresh air (stream #218) and primary fuels (stream #201A) to become a lean fuel mixture at a lambda ratio between 1.01 to 1.80 for an engine/gas turbine #11 (i.e. Lambda ratio= [actual air/fuel ratio]/[stoichiometric air/fuel ratio]). Portion of the reformate (stream #214) in manifold #10C can be used as a reducing gas to regenerate the catalysts in the $NO_x$ and diesel particulate traps. It can also be recycled back as a reactant (stream #215) for rapid start-up of the reformers, and/or can be used to supply $H_2$ (stream #216) to an on-board APU #11A. The APU unit will provide heat and electricity in a small remote area when the big diesel engine is not in operation.

The flow meter/controllers shown in FIG. 1 can be metering pumps, mass flow meters/controllers or automobiles' electronic fuel injectors. Since any one of these flow controllers can regulate precisely the flow rate of a given gaseous and/or liquid reactant according to the predefined set point, the combination of these flow meters/controllers can thus blend several pure gas and liquid components together by controlling each reactant flow rate at a given value. Thus, these controllers can provide the ATR inlet fuel mixture with the specified $O_2/C$, $H_2O/C$ and $CO_2/C$ ratios according to the set point given to each flow controller by the control curve, which is stored in the computer control system. Furthermore, by downloading from the computer a new set point to a specific flow meter/controller, this flow meter/controller can quickly change the flow rate to a new value with excellent repeatability and reproducibility. In other words, the $O_2/C$, $H_2O/C$ and $CO_2/C$ ratios and the total flow rates of the fuel mixture can be maintained and/or changed to a new value very quickly and precisely by this control system.

For this Flex-Fuel $H_2$ reforming apparatus system as shown in an exemplary embodiment in FIG. 1, the water reactant loop is consisted of tank #1, metering pump #50, flow valve #51 and flow meter/controller #52; The gaseous fuel reactant loop is consisted of tank #2, pressure reducer #55a, flow valves #51 and flow meter/controllers #52; The liquid fuel reactant loop is consisted of tank #3, metering pump #50, valves 51 and flow meter/controllers #52; The water electrolyzer is consisted of electrolyzer #5, battery #4, gas filters #5A/#5B and flow valves #51; The water recycle loop is consisted of heat exchanger #7, gas/liquid separator #8, filter #54, metering pump #50 and flow valve #51; The reformate recycle loop is consisted of reformate manifold #10C, compressor #9, flow valve #55 and flow meter/controller #52; The exhaust gas recycle loop is consisted of tank #10E, filter #54, compressor #9, flow valve #55 and flow meter/controller #52; The air loop is consisted of a turbo charger #14, tank #10D, heat exchanger #7, flow valve #55 or #51 and flow meter/controllers #52. Also, another primary air input to the engine/gas turbine is the flow line #218, which consists of a throttle valve #70 and an air mass flow meter (not shown). Since this on-board Flex-Fuel $H_2$ reforming apparatus is controlled and operated automatically by a computer and/or a programmable logic controller (PLC) #100, the valves and the flow meters/controllers installed in every reactant loop must be compatible with the computer's input/output interface modules. In other words, they must be able to be open, closed, regulated and/or controlled by the computer/PLC system.

The IC engine/gas turbine #11 can be started manually using the current automobile's ignition method. In other words, the engine is started with rich combustion using primary air from line #218 and either gaseous or liquid primary fuel in line #201A. Once the engine/gas turbine is started, the primary air and fuel flows are both regulated by the position of the throttle valve #70, which is determined by the driver's desire to control the vehicle's speed. Then, the engine/gas turbine will turn the electrical generator #12 to generate electricity and will supply power to the computer control system #100 and the battery banks #13/#4; The exhaust gas will turn the turbo charger #14 to provide secondary high pressure air for the engine/gas turbine (line #208) and the ATR reformer (line #210). Afterword, the exhaust gas #211 is split into two streams where stream #211A/#212 is recycled back to the reformer to provide heat, $O_2$ and steam to the reformers, and stream #213 will again be split into streams #213A and #213B, so that the $NO_x$ and/or diesel particulate pollutants can be removed by traps #17. Note that a dual trap exhaust pipe system is provided in this system for ease of performing catalyst regeneration. After the traps, the exhaust gas will pass through a catalyst converter #15 and a muffler #16 before venting into atmosphere.

The injector #53 is a specially designed device which can handle the injections of the combustible fuel, water, oxidant and other reactants safely. This injector can combine all the reactants together into a single fuel stream before this fuel mixture is admitted into the first reaction zone in the ATR reformer #6. By properly controlling each reactant's flow rate individually and/or simultaneously to obtain the fuel mixture with the specified $O_2/C$, $H_2O/C$ and $CO_2/C$ ratios, the fuels will be reformed into $H_2$ and CO over the Pt group metal catalyst at a temperature <1200° C. and a pressure between 1 to 100 atmosphere. For performing safe reforming reactions, the ATR reformer is equipped with a thermocouples #56 and a wide band $O_2$ sensor #53A to fine tune the $O_2/C$ ratio of the fuel mixture before the ATR's first reaction zone. Since the reaction temperature is strongly related to the total reaction heats as well as the $O_2/C$ ratio of the fuel mixture, thermocouples can be used effectively to fine tune the $O_2/C$ ratio by adjusting slightly the flow rate of the secondary air flow or primary fuel and $H_2$ flow. Furthermore, to avoid catalyst deactivation, to have long catalyst life and to avoid coke formation, it is necessary to install several thermocouples inside and outside the reaction zones to monitor and to provide the feed-back information for controlling the $O_2/C$, $H_2O/C$ and $CO_2/C$ ratios, and also to keep the reaction temperature constantly below 1200° C., preferably <1000° C.

The PLC/ECU microprocessor and/or the computer control system #100 is capable of operating the whole system automatically. For example, when the pedal is pressed or released by the driver, the position of the throttle valve #70 will response to the driver's desire to increase or decrease the engine speed, and it will increase or decrease the primarily air flow in stream #218 as measured by the air mass flow meter, and the primarily fuel flow in stream #201A. If the molar ratio of $H_2$ flow in line #217/fuel flow in line #201A and the molar ratio of secondary air flow in line #208/$H_2$ flow in line #217 are respectively controlled at a given (constant) value, the position of the throttle valve and/or the air mass flow sensor will also determine the $H_2$ flow rate in line #217 and the secondary air flow rate in line #208. Therefore, the position of the throttle valve will simultaneously determine the flow rates in lines #218, #201A, #217 and #208, and the combination of these flows should provide a lean fuel mixture for the engine/gas turbine at a lambda ratio between 1.01 to 1.80. However, when engine is required to be operated at high loads, the final fuel mixture must be adjusted from the lean side to the rich side to produce more engine power. In this case additional extra fuel from line #201A and extra $H_2$ from line #217 can be injected into the engine.

Regardless of the engine/gas turbine's speed and load, the control strategy is to keep the ratio of $H_2$ flow in line #217/fuel flow in line #201A at a given value between 0.05 to 0.95, and also keep the ratio of $H_2$ flow in line #217/secondary air flow in line #208 at a given value, so that the addition of these $H_2$ and secondary air flows to the original fuel mixture (i.e. fuel #201A and air #218) will change it from the stoichiometric (i.e. Lambda=1.00) into a lean burn mixture at a Lambda between 1.01 to 1.80 (for gasoline car). In this case, the higher the engine speed, the larger amount of $H_2$ is required to be injected into an engine/gas turbine and, thus, the faster the pressure is decreased in tank #10. As the computer control system detects the decrease in the vessel pressure, it can quickly start up the reformers and/or increase the reactants' flow rates to produce more reformate, so that the pressure inside vessel #10 can be maintained between 30 to 100 atmosphere. Similarly, when the engine speed is decreased, less amount of $H_2$ is required and the pressure in vessel #10 will be reduced at a slower rate, and the computer control system will then decrease the reactants' flow rates to reduce the amount of total reformate produced. In this case, one or more ATR reformers can either be shut down or be operating at a reduced capacity when the pressure is closer to the upper limit.

Contrarily to a steady state fuel cell $H_2$ generator, an on-board $H_2$ reforming apparatus will mostly be operated under transient operating conditions, and frequent acceleration and deceleration of a mobile vehicle will create sudden fluctuation in the hydrogen demand. In other words, during the operation, the ATR reformers will be shut down, will be performed at the various flow capacity and will be re-started frequently. Therefore, it is critical to be able to re-start the reformers rapidly without external sources of heat and electricity, so that the reformate pressure in the storage vessel can be maintained within the limits during the sudden acceleration period.

Figure 2:
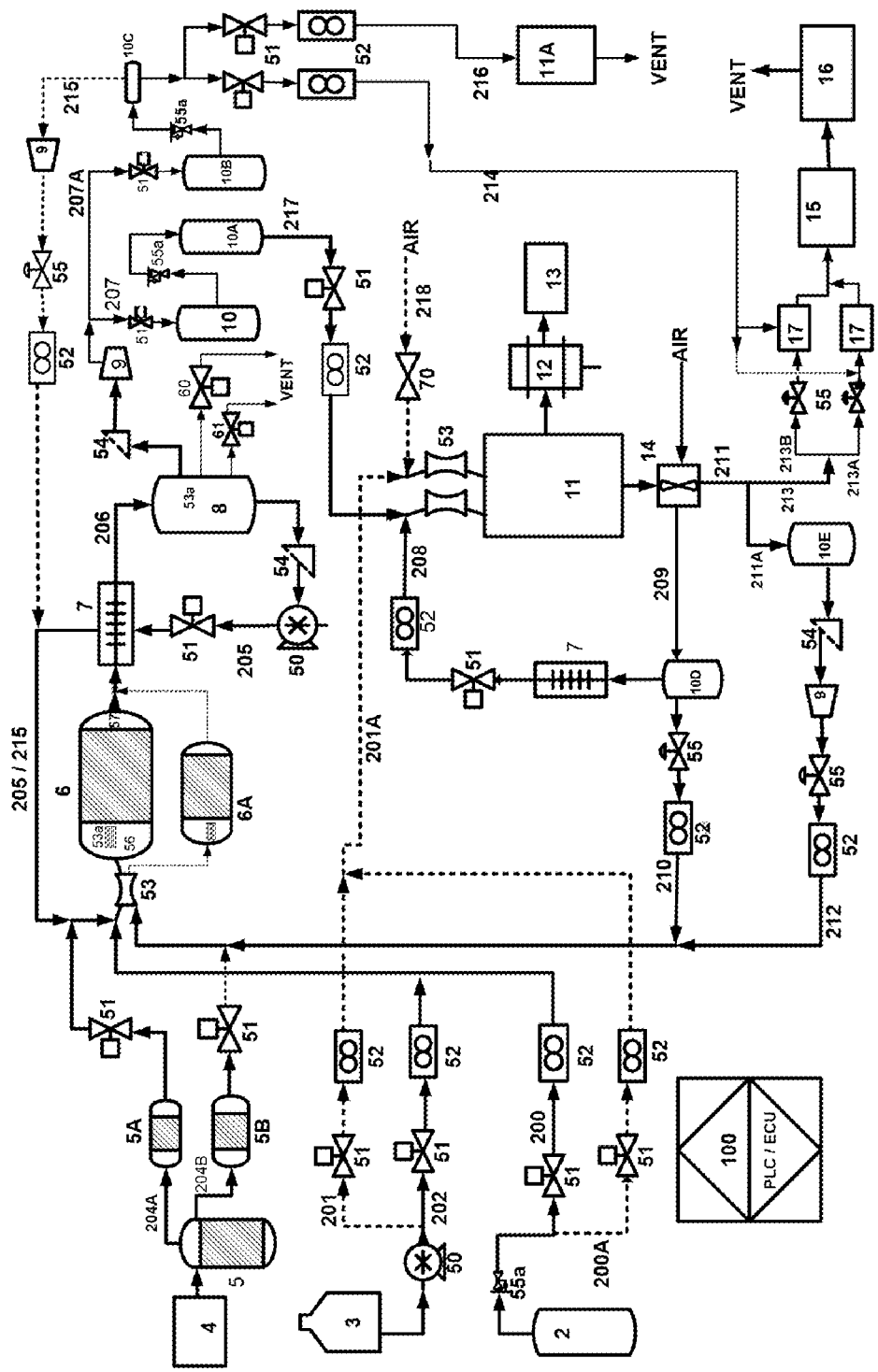
FIG. 2 is a schematic illustration of a system comprising an alternate simplified Flex-Fuel $H_2$ Reforming apparatus, a lean burn diesel engine and an electric generator in accordance with another exemplary embodiment of the present invention.

FIG. 2 shows an alternative simplified Flex-Fuel $H_2$ reforming apparatus which is suitable to be combined with a lean burn diesel truck engine. For a long durable system without coke formation, a reformer would like to be operated under steady state condition and, thus, frequent changes in the flow rates, temperature, $O_2/C$ and $H_2O/C$ ratios should be avoided or minimized. Unfortunately, a diesel engine will constantly be operated under frequent start-up/shutdown, acceleration/deceleration and/or other unsteady state transient operating conditions. In addition, since the commercial diesel oil contains some unsaturated high molecular weight components, and since it is very difficult to vaporize these coke producing fuel components completely within a very short residence time (i.e. under high space velocity operating condition), a second lighter fuel is used in tank #2 for producing $H_2$ without coke formation by the on-board reformer, and the commercial diesel oil in tank#3 is still the main fuel for the diesel truck engine. In this design, one of the fuels selected from the group consist of natural gas, CNG, LPG, gasoline, methanol or bio-ethanol is stored in tank #2, and this fuel is exclusively used by the reformer to produce $H_2$ and CO reformate as a reducing agent for the diesel truck engines. However, for a natural gas truck engine, $H_2$ can be produced from fuel quickly and it is not necessary to have dual fuel tanks.

The description of all other devices/equipments in FIG. 2 are the same as those described in FIG. 1, and the method of operating this simplified Flex-Fuel $H_2$ reforming apparatus for the diesel engine is similar to the method described previously for FIG. 1.

Figure 3:
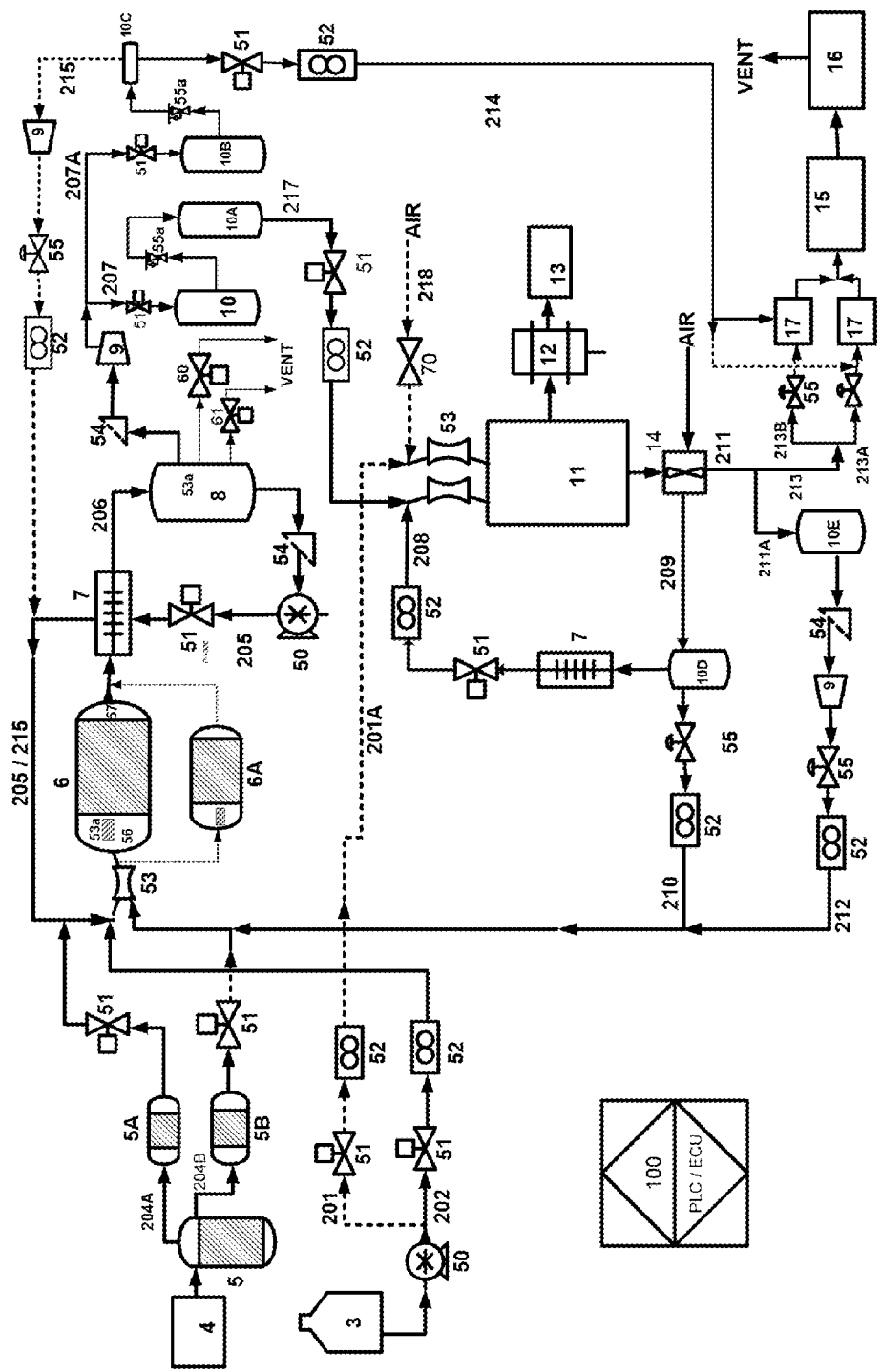
FIG. 3 is a schematic illustration of a system comprising an alternate simplified Flex-Fuel $H_2$ Reforming apparatus, a lean burn IC engine and an electric generator in accordance with another exemplary embodiment of the present invention.

FIG. 3 shows an alternate simplified Flex-Fuel $H_2$ reforming apparatus for a lean burn IC engine which uses CNG (compressed natural gas), $H_2$ rich reformate gas, LPG, gasoline, methanol, bio-ethanol or other light weight hydrocarbons as fuel. Because a lean burn engine will produce more $NO_x$ emission, it is necessary to provide $H_2$ and CO from flow manifold #10C (stream #214) to regenerate periodically the $NO_x$ trap #17.

Figure 4:
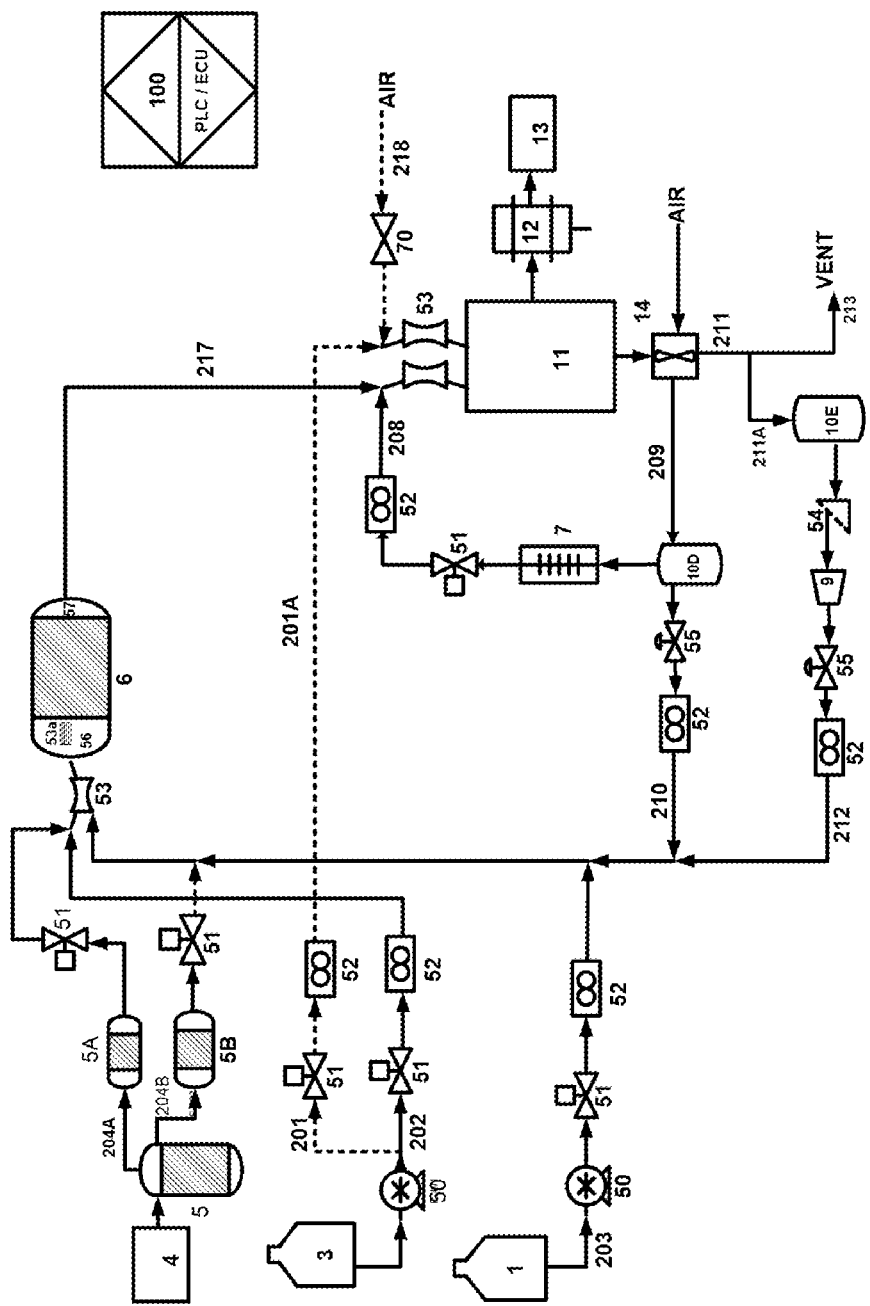
FIG. 4 is a schematic illustration of a system comprising an alternate simplified Flex-Fuel $H_2$ Reforming apparatus, a gas turbine and an electric generator in accordance with another exemplary embodiment of the present invention.

FIG. 4 shows a simplified Flex-Fuel Reforming apparatus for a gas turbine. Here, the reformate comprising higher % $H_2$ and the primary fuel are used as the turbine fuel, and the ATR reformer can physically be integrated into the gas turbine as a single unit. In addition, pure $O_2$ or enriched $O_2$ gas can be used to replace air for the reforming process, so that the reformate contains higher % $H_2$ with less % $N_2$ for the IC engine, gas turbine and solid oxide and/or proton exchange membrane fuel cell devices. In this case, the amount and the flow rate of the $H_2/O_2$ generated by the electrolyzer is directly controlled by the pressure of the reformate storage tank and the control curves.

Figure 5:
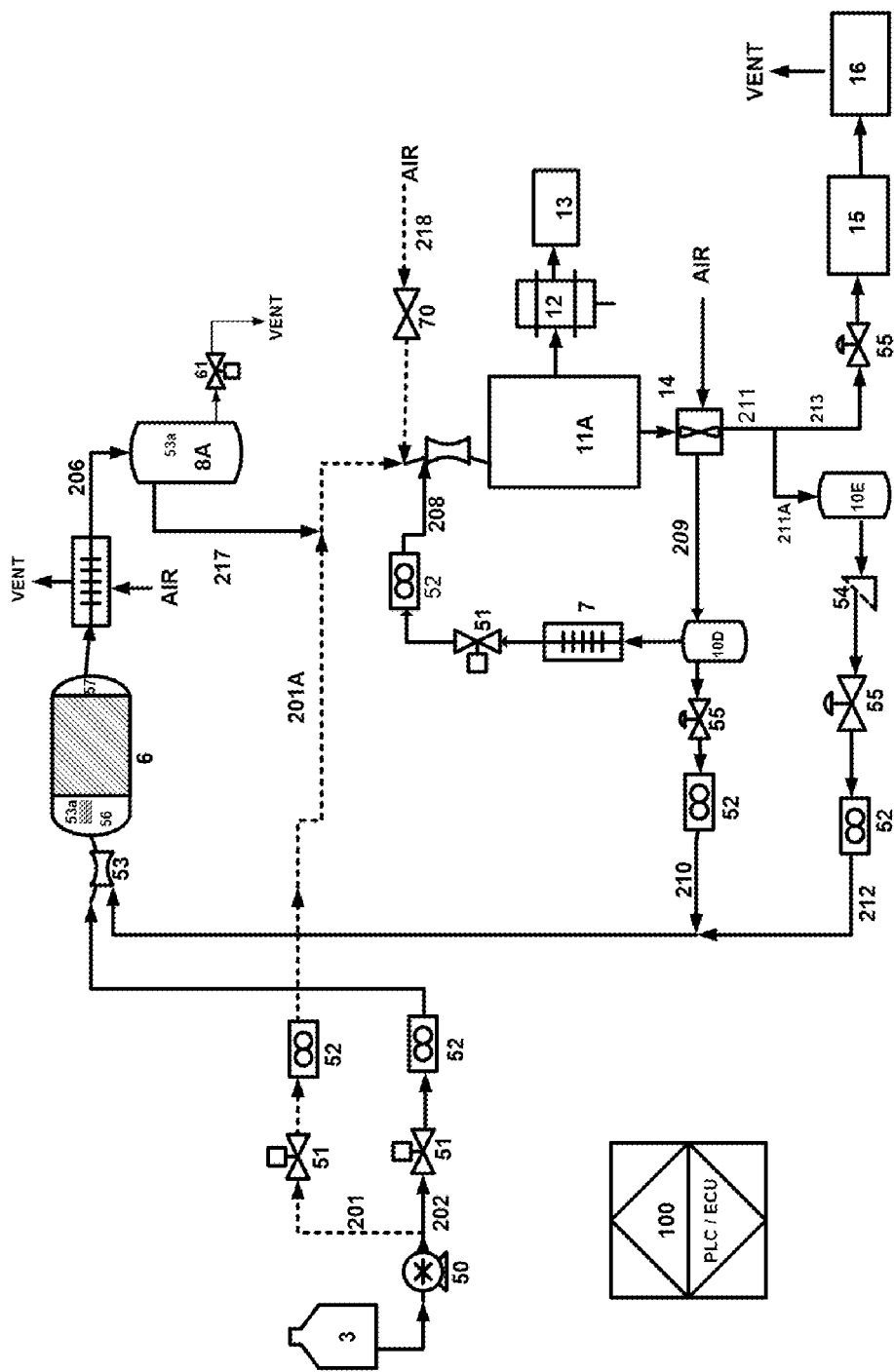
FIG. 5 is a schematic illustration of a system comprising an alternate simplified Flex-Fuel $H_2$ Reforming apparatus and a small utility IC engine in accordance with another exemplary embodiment of the present invention.

For a small and economic utility engine which uses natural gas, LPG, bio-ethanol or gasoline as fuel, a very simple $H_2$ generating system without excess accessories is provided as shown in FIG. 5. Here, the fuel from tank #3 is split into two streams. Stream #201 is injected into the engine directly, and stream #202 will be reformed into $H_2$ using air as oxidant. Also, the recycled exhaust gas is used to provide steam, heat and $CO_2$ to the ATR reformer, but the amount of the % recycled exhaust gas and the condensed water must be controlled to avoid flooding the engine with the condensed water.

Figure 6:
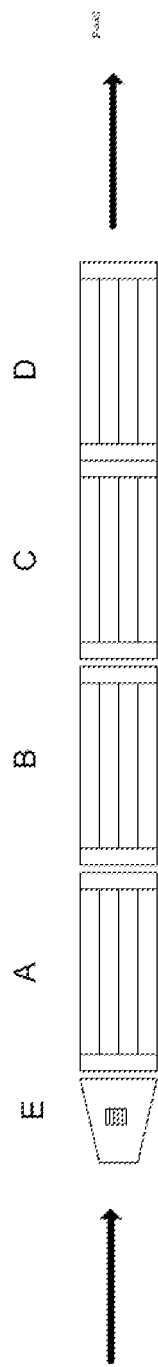
FIG. 6 is a schematic illustration of the shape of catalysts being used inside the Flex-Fuel $H_2$ Reforming apparatus in accordance with the exemplary embodiment of the present invention.
Figure 7:
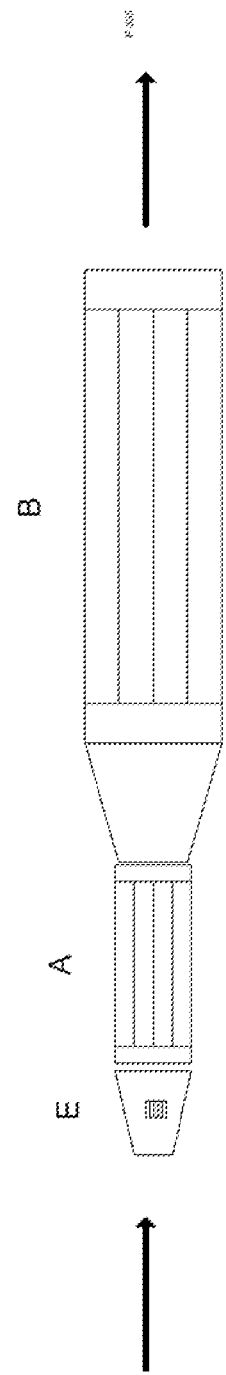
FIG. 7 is a schematic illustration of the shape of catalysts being used inside the Flex-Fuel $H_2$ Reforming apparatus in accordance with another exemplary embodiment of the present invention.

FIG. 6 and FIG. 7 describe the shape of the catalysts used in the reformer. For example, the ATR reformer comprising only the CPO/SR catalysts in the first reaction zone will typically have catalyst shape as shown in FIG. 6, and an reformer comprising catalysts in all three CPO/SR, SR and WGS reaction zones will have catalyst shape as shown in FIG. 7. Also shown in these figures, a back-up flame igniter E is installed before the first catalyst sample for the purpose of initiating the CPO reactions manually.

Figure 8B:
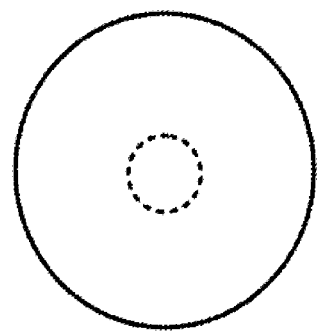
FIGS. 8A and 8B are the schematic illustrations of a large metallic catalyst being used inside the Flex-Fuel $H_2$ Reforming apparatus in accordance with another exemplary embodiment of the present invention.
Figure 8A:
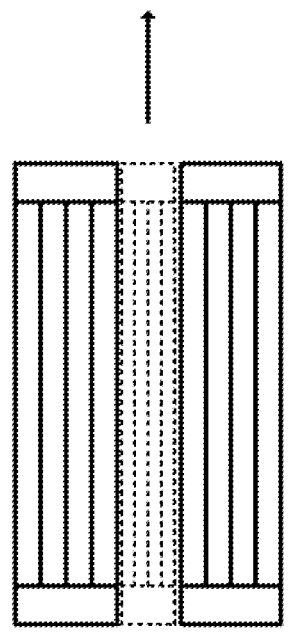

For a large round metallic monolith catalyst, it is very difficult to measure the fresh and the aged catalytic activities in the laboratory. Therefore, one single large metallic monolith catalyst is designed to consist a smaller catalyst core at the center, and a large annular catalyst core on the outside, as shown in FIG. 8A and FIG. 8B. The smaller catalyst core in the center is designed to be able to remove from the whole unit without destroying the outside annular core, so that its catalytic activity can be evaluated by a laboratory testing unit. This catalyst design is especially useful to determine if an aged or a regenerated catalyst is still effective in reducing the emissions, and also to measure the rate of the catalytic deactivation as a function of time on stream. If necessary, the smaller catalyst core can either be restored back into the same location or be replaced by an identical fresh one after laboratory activity evaluation.

Figures 9A, 9B:
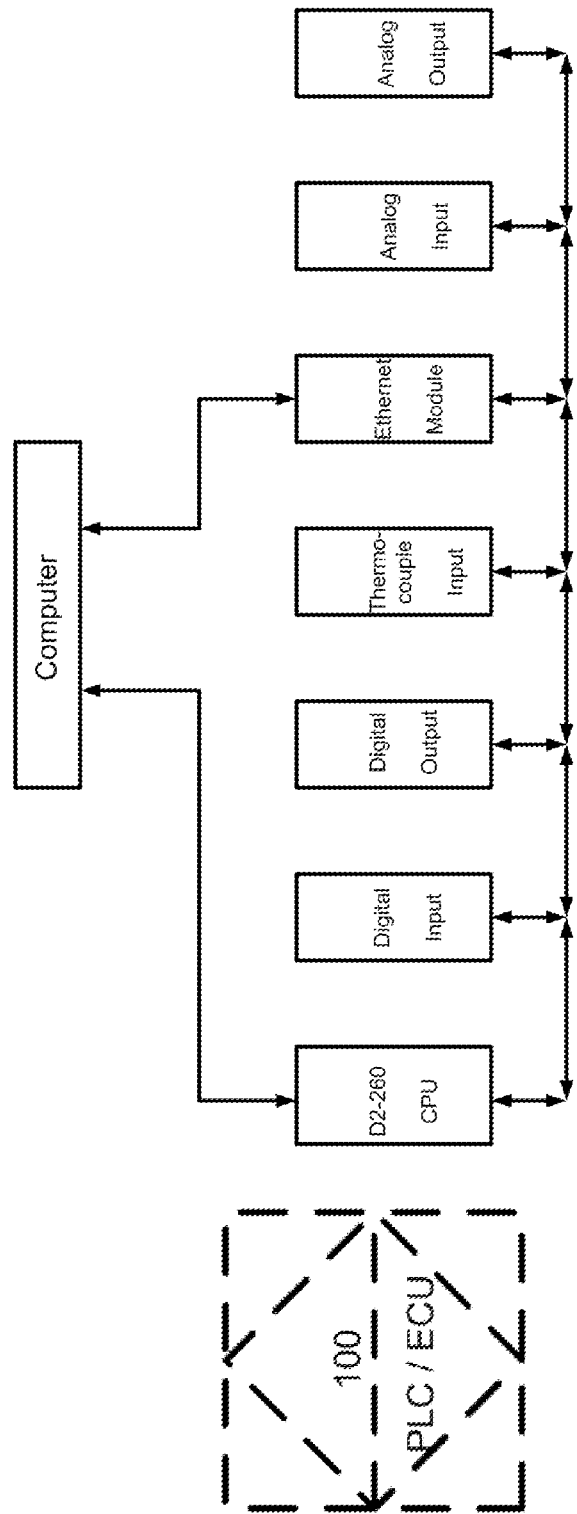
FIGS. 9A and 9B are the schematic illustrations of a system comprising a personal computer and a programmable logic controller in accordance with the exemplary embodiment of the present invention.

FIG. 9B shows the brain of the whole control system and it is represented as FIG. 9A in FIGS. 1 through 5. Here, a programmable Logic Controller (PLC, D2-260CPU unit from www.automationdirect.com) is connected and communicated to a HP PC computer through a RS-232 or an Ethernet cable, and this CPU module can also communicated with several input/output interface modules. Here, the main computer control software of the whole system is installed in the PC, and the PC will download a group of pre-calibrated set points to the PLC, which in term will transmit the control signal to the proper I/O module and carry out the actual control actions by the controllers. In other words, Once the interface modules receive the control signals, they can control and monitor pumps, flow meters/controllers, valves, thermocouples, $O_2$ sensor and other devices in the system. Similarly, each device's status and the sensors' signal can transmit to the PLC and the PC via the reverse signal paths.

Figure 10:
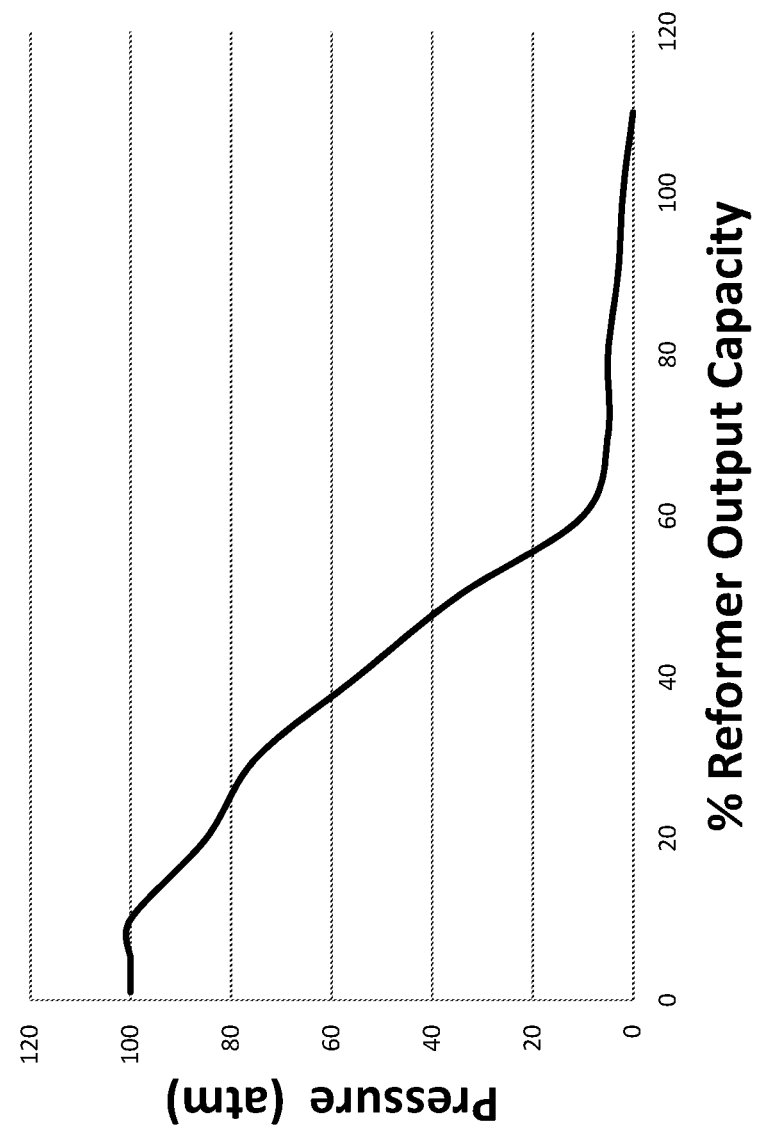
FIG. 10 is the illustration of a control curve showing the relationship between the % reformer output capacity as a function of the reformate's pressure in the storage vessels.

FIG. 10 demonstrates one of the control curves which shows the total % reformate output from the ATR reformers as a function of the pressure in vessels #10 and #10B. Here, each point in the curve represents a complete group of pre-calibrated set points for all flow meters/controllers at the same specific $O_2/C$, $H_2O/C$ and $CO_2/C$ ratios, and at a given total reformate output from the reformers. Typically, as a given group of set points is downloaded from the PC to the PLC, the PLC will transmit the pre-calibrated set point to each flow meter/controller in the system and adjust each reactant's flow rate accordingly. Therefore, by blending all the individual reactant flow together, the $O_2/C$, $H_2O/C$ and $CO_2/C$ ratios of the reformers' inlet fuel mixture can be controlled at a specific value and, thus, can produce the reformate with the same gas composition. In other words, every point in this control curve can actually provide the fuel mixture and the reformate with the same composition, but at a different total flow rates. Similarly, the pre-calibrated control curves for other fuel mixtures with different $O_2/C$, $H_2O/C$ and $CO_2/C$ ratios and various flow rates can also be provided. Therefore, the same reformer has the flexibility of being used to produce $H_2$ and CO reformate from various fuels and/or bio-fuels.

For a smaller system, the functions of the PC and the PLC as shown in FIG. 9B can be replaced by a powerful microprocessor, or by a small PC with the necessary I/O modules installed. Therefore, the automatic operation of this system can be done easily by a single alternative powerful control device.

Example

Several fully automatic laboratory reactor systems, which had adopted the similar control strategy as shown in FIG. 9B, had been assembled in the past. The reactor systems were used either to produce hydrogen from hydrocarbons and/or bio-fuels, or to evaluate catalytic activities of the laboratory experimental catalysts. These systems were very easy to operate and very reliable for performing daily routine experiments for several years.

Example 1

A larger laboratory reactor system which had more I/O modules than the one shown in FIG. 9B was used to study the catalytic autothermal reforming of bio-ethanol for hydrogen production. Here, a Simatic S7-400 PLC, all interface modules and the step-7 communication software were purchased from Siemens, and were installed and assembled together with a laptop computer as the main control computer.

A custom master control program stored in the main laptop computer was written in visual Basic to run the whole reactor system automatically. To operate the laboratory reactor system, the operator pushed the start-up button, turned on the external power supply relays and initiated the control program to start the test. According to the procedures written in the master control program, the PC would download the pre-defined set points simultaneously to the mass flow meters, metering pumps and furnaces. It would then turn on the solenoid valves according the pre-determined sequence to blend the fuel mixture from the pure gas/liquid supply tanks and provided a given fuel mixture with the specified $O_2/C$ and $H_2O/C$ ratios to the ATR reformer. Subsequently, the control program could start heating the furnaces, and could control and monitor/record the reactor temperatures and gas compositions. In other words, the control system, just like a technician, could perform the complete test procedures and record the test results automatically according to the procedures written in the master control software.

TABLE 2

Autothermal Reforming of bio-Ethanol to Produce $H_2$ (Hwang, 2006 NATPA Annual Conference, Newark, California, Jul. 29, 2006).

| Product Gas | Volume %, (dry) |
| --- | --- |
| $H_2$ | 37.53 |
| $O_2$ | 0.00 |
| $N_2$ | 39.26 |
| $CH_4$ | 0.00 |
| CO | 7.52 |
| $CO_2$ | 16.58 |
| $C_2H_5OH$ | 0.00 |

An Agilent's Micro GC (model: refinery gas analyzer) was used to analyze the inlet reactant and the product gas compositions; The catalyst used was a ceramic monolithic catalyst (400 CPI) containing 80 g/ft$^3$ total metals (Pt/Pd/Rh/CeO$_2$—Al$_2$O$_3$—ZrO$_2$, 2/1/1 metal ratio), and the ethanol, water and air feed rates were 10.54, 22.50 and 23.57 moles/hr respectively (i.e. $H_2O/C$=1.07; $O_2/C$=2.34). The test results at the inlet temperature of 262° C. are shown in Table 2. Note that the complete 100% ethanol conversation was observed, and that the reactor was reliable for daily operation with excellent repeatability and test reproducibility.

Example 2

As shown in FIG. 9B, a DL-260 CPU PLC with digital input, digital output, analog input, analog output, ethernet communication module and thermocouple interface modules were purchased from www.Automation Direct.com; In this simple and cheaper control system, the valves #51 are connected to the digital output module; The mass flow meters (Tylan mass flow meters from www.ebay.com) and one water metering pump (model QV-#RHOCKC from Fluid Metering Inc.) are connected to the analog output and also to the analog input modules, and several type K thermocouples are connected to the thermocouple module.

A small Acer ASPIRE ONE laptop computer running Window XP is used as a master computer. A master control software which is written in visual Basic is used to download flow controllers' set points, to open/close valves, to monitor/control reactor temperatures, to monitor/record the status of each device, to carry out the experimental sequences and the method of operating this Flex-Fuel $H_2$ reforming apparatus automatically.

This PLC control system is configured by Directsoft software and it can communicate with the ACER PC via KEPDirect communication software (both software were purchased from Automationdirect.com). The KEPDirect communication software can actually operate the whole control system manually.

The following is a listing of selected figure elements as already mentioned in the specification above:
1 water reactant loop tank
2 gaseous fuel reactant loop tank
3 liquid fuel reactant loop tank
4 battery for water electrolyzer
5 water electrolyzer
5A gas filter
5B gas filter
6 ATR reformer
7 respective heat exchangers of water recycle loop and air loop
8 gas/liquid separator of water recycle loop
9 compressor of reformate recycle loop and exhaust gas recycle loop
10 dry reformate storage vessel
10B dry reformate storage vessel
10A flow manifold
10C reformate manifold of reformate recycle loop
10E tank of exhaust gas recycle loop
10D tank of air loop
11 IC engine/gas turbine
12 electrical generator
100 programmable logic controller (PLC)

I claim:

1. An on-board Flex-Fuel $H_2$ Reforming device, comprising:
   (a) one or more parallel autothermal reformers (ATRs) to produce a reformate comprising $H_2$ and CO from a fuel, said fuel comprising a hydrocarbon, a bio-fuel, or combinations thereof;
   (b) at least one of a supported catalyst or an unsupported catalyst disposed in the ATRs, the at least one supported or unsupported catalyst including one or more of Pt, Pd, Rh, Ir, Os, and Ru;
   (c) an ATR reformer fuel mixture inlet in fluid communication with the one or more parallel ATRs to provide reactants thereto, said inlet comprising at least one of a liquid fuel loop, a gas fuel loop, a water supply loop, an air supply loop, a water electrolyzer loop, an exhaust gas recycle (EGR) loop, a water recycle loop and a reformate recycle loop, the reactants including i) water and/or steam, ii) an oxidant and iii) said fuel;
   (d) an automatic control system operably connected with the fuel mixture inlet and the one or more parallel ATRs, said automatic control system configured to maintain a selected $O_2/C$ ratio, a selected $H_2O/C$ ratio, a selected $CO_2/C$ ratio and a maximum ATR reaction temperature below 1200° C., the automatic control system including a flow control curve to regulate the reformate output, wherein a single point on the flow control curve provides a group of pre-calibrated and stored set points for a respective flow controller associated with each reactant,
   (e) a reformate vessel to store the reformate produced in the one or more parallel ATRs; and
   (f) a dry reformate storage vessel in fluid communication with the reformate vessel to store a dried form of the reformate, and wherein the flow control curve regulates a total reformate output as a function of the pressure in the dry reformate storage vessel.

2. The device of claim 1, comprising at least one of an internal combustion (IC) engine, a gas turbine and a fuel cell device in communication with said dry reformate storage vessel to receive the dry reformate for combustion the at least one of an (IC) engine, gas turbine, and fuel cell device.

3. The device of claim 2, wherein the gas turbine is configured to drive at least one of an electric generator, an automobile, a lawn mower, a fork lift truck, a diesel truck, a bus, a train and a motorcycle.

4. The device of claim 2, wherein the IC engine is configured to drive at least one of an electric generator, an automobile, a lawn mower, a fork lift truck, a diesel truck, a bus, a train and a motorcycle.

5. The device of claim 1, comprising at least one of a standalone distributed mobile and a stationary power station configured to receive electricity generated by the at least one of an (IC) engine, gas turbine, and fuel cell device.

6. The device of claim 1, wherein the automatic control system includes one or more of i) a flow control curve to regulate the flow rate of each reactant, and ii) a composition control curve to regulate a dry reformate composition of the dry reformate.

7. The device of claim 1, wherein an inlet fuel mixture to a selected ATR is provided at $O_2/C$, $H_2O/C$ and $CO_2/C$ ratios according to said set points.

8. The on-board Flex-Fuel $H_2$ Reforming device of claim 1, comprising at least one of a lean burn engine or a gas turbine as a driving device for at least one of: an electric generator, an automobile, a lawn mower, a fork lift truck, a diesel truck, a bus, a train or a motorcycle in communication with said dry reformate storage vessel to receive the dry reformate for combustion therein.

9. The on-board Flex-Fuel $H_2$ Reforming device of claim 1, comprising at least one of a lean burn engine or a gas turbine as the driving device for an electric generator configured as an on-board electric charger for an electric vehicle, the lean burn engine or a gas turbine in communication with said dry reformate storage vessel to receive the dry reformate therefrom for combustion therein.

10. The on-board Flex-Fuel $H_2$ Reforming device of claim 1, comprising at least one of an automobile, a lawn mower, a truck, a forklift truck, a bus, a train, a motorcycle, a portable industrial electrical equipment, a portable industrial electrical device, a portable household electrical equipment, a portable household electrical device, an electric utility vehicle, a battery charger or a backup power source in communication with said dry reformate storage vessel to receive the dry reformate therefrom for combustion therein.

11. The on-board Flex-Fuel $H_2$ Reforming device of claim 1, comprising at least one of a mobile electric vehicle and an electric device equipped with: at least one of a solid oxide membrane fuel cell stack and a proton exchange membrane fuel cell stack in communication with said dry reformate storage vessel to receive the dry reformate therefrom for combustion therein.

12. The on-board Flex-Fuel $H_2$ Reforming device of claim 1, wherein the at least one supported or unsupported catalyst includes a high temperature inert carrier with a catalyzed washcoat powder and a total Pt group metal loading of 0.1 to 2000 g/ft3 of a catalyst volume.

13. A method of using an on-board Flex-Fuel $H_2$ Reforming device, comprising:
   providing the on-board Flex-Fuel $H_2$ Reforming device of claim 1;
   providing an inlet fuel mixture to the fuel mixture inlet, said inlet fuel mixture comprising said fuel, $H_2O$, and $O_2$;
   reacting said inlet fuel mixture with at least one of said catalysts inside the one or more parallel ATRs to produce a reformate containing $H_2$ and CO from said fuel, and simultaneously controlling at least one of an $O_2/C$ ratio, a $H_2O/C$ ratio and a $CO_2/C$ ratio of the inlet fuel mixture;

maintaining a maximum ATR reaction temperature below 1200° C.;

storing a dry reformate produced from the one or more parallel ATRs in the dry reformate storage vessel at a storage pressure between 1 to 100 atmospheres;

using the flow control curve to regulate the reformate output;

supplying said dry reformate to at least one of an internal combustion engine (IC), a gas turbine or a fuel cell device; and combusting said dry reformate in the at least one of an internal combustion engine (IC), gas turbine or fuel cell device.

14. The method of claim 13, comprising using the flow control curve to regulate at least one of a reactant flow rate, a dry reformate composition of the dry reformate, and a total reformer flow output by the storage pressure in said dry reformate storage vessel.

15. The method of claim 13, comprising:

maintaining a first catalytic partial oxidation/steam reforming CPO/SR) reaction zone in the one or more parallel ATRs while maintaining at selected respective values the $O_2/C$ ratio, the $H_2O/C$ ratio and the $CO_2/C$ ratio of the inlet fuel mixture to create a reformate mixture;

reacting said inlet fuel mixture over at least one of the supported and unsupported catalysts for less than a 300 millisecond residence time as calculated at standard temperature and pressure (STP) in the first CPO/SR reaction zone;

reacting the fuel and the reformate mixture over at least one of the supported and unsupported catalysts for less than 5 seconds in a second steam reforming (SR) reaction zone of the one or more parallel ATRs;

producing a reformate stream at a reformate temperature between 150-1200° C. and at a reformate storage pressure between 1 to 100 atmospheres, wherein said reformate stream comprises at least one of a reformate $H_2$, a reformate CO, a reformate $CO_2$, a reformate $N_2$, a reformate $O_2$ and an unconverted portion of the fuel;

feeding the produced reformate stream into a water gas shift (WGS) reaction zone of the one or more parallel ATRs for less than 100 seconds; and converting a portion of the water in the inlet fuel mixture and a CO in the inlet fuel mixture into hydrogen by utilizing at least one of the supported or unsupported catalysts and a Cu/Zn oxide catalyst at a temperature between 50-500° C.

16. The method of claim 13, comprising producing a $H_2$ reformate and a CO reformate as a reducing agent and regenerating the supported or unsupported catalyst in the one or more ATRs using the $H_2$ and CO reformate as a reducing agent.

17. The method of claim 13, comprising:

maintaining a vessel pressure of the reformate in the dry reformate storage vessel between 30 to 100 atmospheres, thereby permitting said vessel pressure to start up and shut down the on-board Flex-Fuel $H_2$ Reforming device; and adjusting the flow output of the one or more parallel ATRs according to the flow control curve.

18. The method of claim 14, further comprising regulating the reformate pressure of the dry reformate storage vessel to regulate the reactant flow rate according to the flow control curve, and is therefore used to increase or decrease a total amount of a reformate output by the one or more parallel ATRs with a specified dry reformate composition according to said $O_2/C$, H2O/C and $CO_2/C$ ratios of said inlet fuel mixture.

19. The method of claim 16, wherein the on-board Flex-Fuel $H_2$ Reforming device includes at least one of an internal combustion (IC) engine, a gas turbine and a fuel cell device in communication with said dry reformate storage vessel to receive the dry reformate for combustion the at least one of an (IC) engine, gas turbine, and fuel cell device and includes an NOx trap and a catalytic converter in gaseous communication with an exhaust of the at least one of an (IC) engine, gas turbine, and fuel cell device, the method including:

reducing the supported and/or unsupported catalysts;

regenerating a catalyst in the catalytic converter; and removing particulates in the NOx trap using the reformate in the dry reformate storage vessel as a reducing gas.

20. The method of claim 13, comprising supplying at least one of a $H_2$ and a $H_2$ rich reformate to at least one of an IC engine, a gas turbine, a fuel cell device, and a catalytic combustor to supply both heat and power as an on-board Auxiliary Power Unit.

21. The method of claim 13, wherein said fuel is selected from one or more of a C1-C16 hydrocarbon, a methane, a natural gas, a methane hydrate, a LPG, a C1-C8 alcohol, a vegetable oil, a bio-ethanol, a bio-diesel, a bio-methane, an industrial waste, a vent gas containing a volatile organic compound, an agriculture biomass waste bio-fuel, an industrial biomass waste bio-fuel, and an animal biomass waste.

22. The method of claim 14, comprising:

controlling the dry reformate storage vessel pressure using the flow control curve; and changing at least one of an amount of $H_2$ production, an amount $O_2$ production, a $H_2$ flow rate and an $O_2$ flow rate.

23. The method of claim 14, wherein the at least one flow control curve provides a total percentage reformate output capacity from the one or more parallel ATRs as a function of said reformate pressure in the dry reformate storage vessel.

* * * * *